(12) United States Patent
Khlat

(10) Patent No.: US 9,319,214 B2
(45) Date of Patent: Apr. 19, 2016

(54) MULTI-MODE POWER AMPLIFIER ARCHITECTURE

(71) Applicant: RF Micro Devices, Inc., Greensboro, NC (US)

(72) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 50 days.

(21) Appl. No.: 13/887,965

(22) Filed: May 6, 2013

(65) Prior Publication Data

US 2013/0250820 A1 Sep. 26, 2013

Related U.S. Application Data

(63) Continuation-in-part of application No. 13/732,935, filed on Jan. 2, 2013, which is a continuation of application No. 12/899,632, filed on Oct. 7, 2010, now Pat. No. 8,369,250.

(60) Provisional application No. 61/249,458, filed on Oct. 7, 2009.

(51) Int. Cl.
*H04L 5/18* (2006.01)
*H04B 1/00* (2006.01)
*H04L 5/14* (2006.01)

(52) U.S. Cl.
CPC .............. *H04L 5/18* (2013.01); *H04B 1/0057* (2013.01); *H04L 5/14* (2013.01)

(58) Field of Classification Search
CPC ........... H04L 5/18; H04L 5/14; H04B 1/0057

USPC .................... 370/280, 281, 330, 478
See application file for complete search history.

(56) References Cited

U.S. PATENT DOCUMENTS

| 6,130,897 | A  | * | 10/2000 | Ishida et al. ................. 370/478 |
| 7,656,251 | B1 |   | 2/2010  | Bauder et al. |
| 8,369,250 | B1 |   | 2/2013  | Khlat |
| 2002/0090974 | A1 | * | 7/2002 | Hagn ............................ 455/552 |
| 2002/0176375 | A1 |   | 11/2002 | Barabash et al. |
| 2003/0039303 | A1 | * | 2/2003 | Sriram ......................... 375/147 |
| 2003/0174099 | A1 | * | 9/2003 | Bauer et al. ................. 343/893 |
| 2005/0107115 | A1 | * | 5/2005 | Wu ............................. 455/552.1 |
| 2005/0141450 | A1 | * | 6/2005 | Carlton et al. ............... 370/329 |
| 2005/0208918 | A1 | * | 9/2005 | Rowe et al. .................. 455/296 |
| 2006/0256754 | A1 | * | 11/2006 | Liu et al. ..................... 370/335 |
| 2006/0276158 | A1 |   | 12/2006 | Okabe |
| 2007/0165584 | A1 | * | 7/2007 | Ponnampalam et al. ..... 370/338 |
| 2008/0165366 | A1 | * | 7/2008 | Schmitt ........................ 356/519 |
| 2008/0279123 | A1 |   | 11/2008 | Struhsaker et al. |

(Continued)

OTHER PUBLICATIONS

Notice of Allowance for U.S. Appl. No. 12/899,632, mailed Oct. 5, 2012, 9 pages.

(Continued)

*Primary Examiner* — Brian D Nguyen
(74) *Attorney, Agent, or Firm* — Withrow & Terranova, P.L.L.C.

(57) ABSTRACT

Radio frequency (RF) circuitry, which includes a time division duplex (TDD)/frequency division duplex (FDD) driver stage, a TDD final stage, an FDD final stage, and power directing circuitry, is disclosed. The power directing circuitry is coupled between the TDD/FDD driver stage and the TDD final stage, and is further coupled between the TDD/FDD driver stage and the FDD final stage.

19 Claims, 19 Drawing Sheets

(56) References Cited

U.S. PATENT DOCUMENTS

| | | |
|---|---|---|
| 2008/0316947 A1* | 12/2008 | Lindoff et al. ............... 370/294 |
| 2009/0004981 A1* | 1/2009 | Eliezer et al. ............. 455/127.1 |
| 2009/0016363 A1 | 1/2009 | Laroia et al. |
| 2009/0059820 A1 | 3/2009 | Jung et al. |
| 2009/0180408 A1 | 7/2009 | Graybeal et al. |
| 2009/0262719 A1 | 10/2009 | Shim et al. |
| 2009/0275357 A1 | 11/2009 | Nakamura et al. |
| 2009/0296609 A1 | 12/2009 | Choi et al. |
| 2010/0020731 A1 | 1/2010 | Bourdeaut et al. |
| 2011/0032854 A1 | 2/2011 | Carney et al. |

OTHER PUBLICATIONS

Non-Final Office Action for U.S. Appl. No. 13/732,935, mailed May 7, 2014, 5 pages.

* cited by examiner

MULTI-MODE POWER AMPLIFIER ARCHITECTURE

RELATED APPLICATIONS

The present application claims priority to and is a continuation-in-part of U.S. patent application Ser. No. 13/732,935, filed Jan. 2, 2013, now abandoned, entitled "MULTI-MODE SPLIT BAND DUPLEXER ARCHITECTURE." U.S. patent application Ser. No. 13/732,935, filed Jan. 2, 2013, claims priority to and is a continuation of U.S. patent application Ser. No. 12/899,632, now U.S. Pat. No. 8,369,250, filed Oct. 7, 2010, entitled "MULTI-MODE SPLIT BAND DUPLEXER ARCHITECTURE," which claims priority to U.S. Provisional Patent Application No. 61/249,458, filed Oct. 7, 2009.

All of the applications listed above are hereby incorporated herein by reference in their entireties.

FIELD OF THE INVENTION

The present invention relates to radio frequency (RF) duplexers, which may be used in RF communications circuitry.

BACKGROUND OF THE INVENTION

RF communications systems typically communicate using at least one of three different modes of operation. The first mode, called simplex, is a one-way mode of operation, in which a transmitter from one location transmits data to a receiver at another location. For example, a broadcast radio station transmits data one-way to radios. The second mode, called half-duplex, is a two-way mode of operation, in which a first transceiver communicates with a second transceiver; however, only one transceiver transmits at a time. Therefore, the transmitter and receiver in a transceiver do not operate simultaneously. For example, certain telemetry systems operate in a send-then-wait-for-reply manner. The third mode, called full-duplex, is a simultaneous two-way mode of operation, in which a first transceiver communicates with a second transceiver, and both transceivers may transmit simultaneously; therefore, the transmitter and receiver in a transceiver must be capable of operating simultaneously. In a full-duplex transceiver, signals from the transmitter must not interfere with signals received by the receiver; therefore, transmitted signals are at transmit frequencies that are different from received signals, which are at receive frequencies. The difference between a transmit frequency and a receive frequency is called the duplex frequency. For example, certain cellular telephone systems operate using a full-duplex mode of operation.

Full-duplex transceivers using a single antenna often use a duplexer to couple the transmitter and receiver to the single antenna. A duplexer enables simultaneous transmission and reception of RF signals by providing a transmit passband that does not overlap with a receive passband, which prevents interference between transmit and receive signals. The non-overlapping area is also known as a duplex gap. Some communications protocols, such as specific Universal Mobile Telecommunications System (UMTS) bands have duplex gaps that are narrow relative to the transmit and receive passbands; therefore, providing the required transmit and receive passbands with minimal insertion loss while providing required isolation between transmit and receive signals may be difficult.

Additionally, as wireless communications technologies evolve, wireless communications systems become increasingly sophisticated. As a result, multi-mode and multi-band wireless systems are becoming routinely available. Such systems may include common circuit elements to support multiple modes, multiple bands, or both to reduce size, cost, and insertion losses. Thus, there is a need for a multi-mode duplexer architecture that supports multi-mode functionality, simplifies front-end architectures, and provides required transmit and receive passbands with minimal insertion loss while providing required isolation between transmit and receive signals.

SUMMARY OF THE INVENTION

Radio frequency (RF) circuitry, which includes a time division duplex (TDD)/frequency division duplex (FDD) driver stage, a TDD final stage, an FDD final stage, and power directing circuitry, is disclosed. The power directing circuitry is coupled between the TDD/FDD driver stage and the TDD final stage, and is further coupled between the TDD/FDD driver stage and the FDD final stage.

In one embodiment of the RF circuitry, the power directing circuitry either directs a driver stage output signal from the TDD/FDD driver stage to the FDD final stage or directs the driver stage output signal to the TDD final stage based on a selected operating mode of the RF circuitry. As such, the RF circuitry is capable of providing multi-mode functionality. In an alternate embodiment of the RF circuitry, the RF circuitry further includes RF bypass circuitry coupled to an output from the TDD/FDD driver stage. The TDD final stage provides a first RF output signal, the FDD final stage provides a second RF output signal, or the TDD/FDD driver stage provides a third RF output signal based on the selected operating mode of the RF circuitry. As such, the RF circuitry is capable of providing additional multi-mode functionality.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
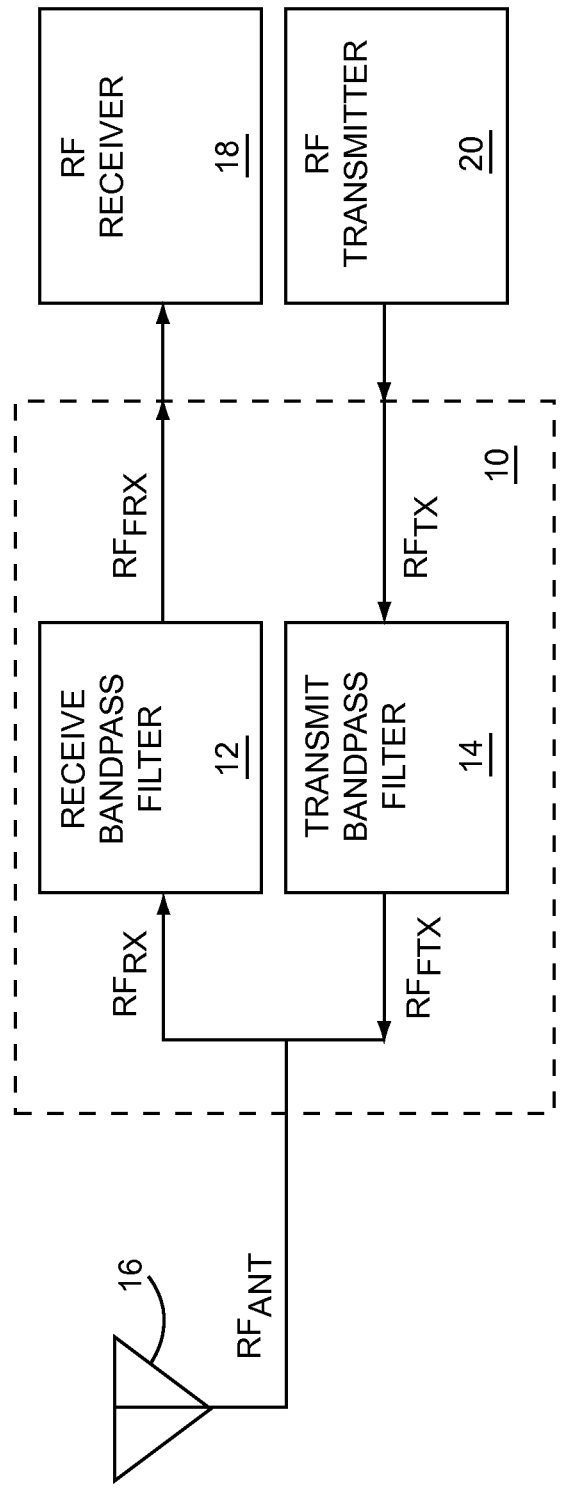
FIG. 1 shows an RF duplexer according to the prior art.

FIG. 1 shows an RF duplexer 10 according to the prior art. The RF duplexer 10 includes a receive bandpass filter 12 and a transmit bandpass filter 14, which are both coupled to an antenna 16. The antenna 16 has an antenna signal $RF_{ANT}$, which provides a receive signal $RF_{RX}$ to the receive bandbass filter 12, and receives a filtered transmit signal $RF_{FTX}$ from the transmit bandpass filter 14. The receive bandpass filter 12 provides a filtered receive signal $RF_{FRX}$ to an RF receiver 18, and the transmit bandpass filter 14 receives a transmit signal $RF_{TX}$ from an RF transmitter 20. Normally, the passband of the receive bandpass filter 12 does not overlap the passband of the transmit bandpass filter 14 to prevent noise from the transmit signal path or transmit signals from interfering with receiver operation.

Figure 2:
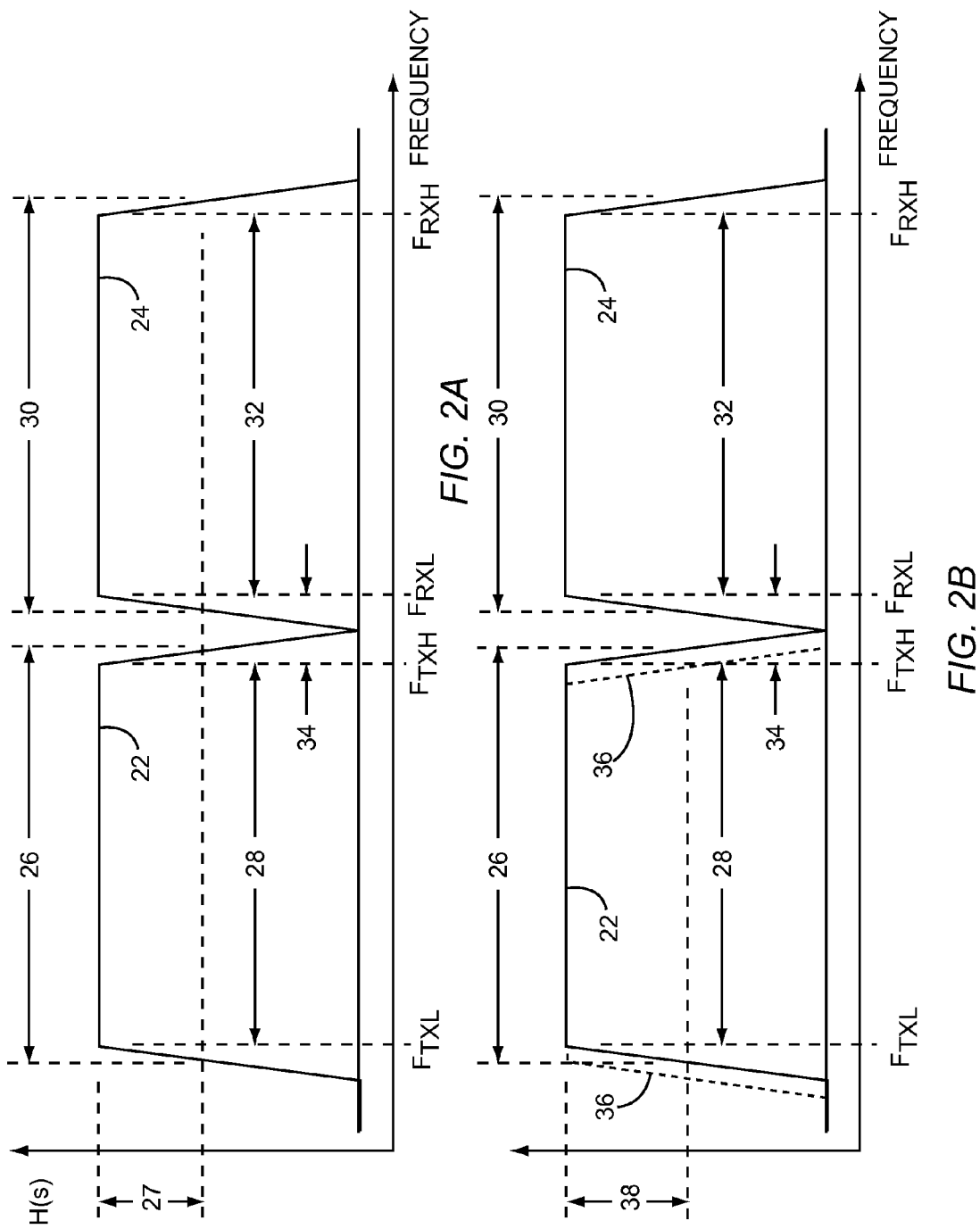
FIGS. 2A and 2B are graphs comparing ideal transmit and receive bandpass filter response curves for an RF duplexer with a downward shifted transmit bandpass filter response curve.

FIG. 2A is a graph showing ideal transmit and receive bandpass filter response curves 22, 24 for an RF duplexer. The ideal transmit and receive bandpass filter response curves 22, 24 show the ideal transfer functions H(s) of the receive and transmit bandpass filters 12, 14 as a function of frequency. The ideal transmit bandpass filter response curve 22 has a full transmit bandpass filter bandwidth 26, which is measured at a filter breakpoint 27 below the maximum of the response curve 22. A full transmit passband 28 spans the transmit frequency ranges used by the RF duplexer 10. The ideal receive bandpass filter response curve 24 includes a full receive bandpass filter bandwidth 30, which is measured at the filter breakpoint 27 below the maximum of the response curve 24. A full receive passband 32 spans the receive frequency ranges used by the RF duplexer 10. A duplex gap 34 separates the full transmit passband 28 from the full receive passband 32, and provides isolation between transmit signals and RF signals. A lowest transmit passband frequency $F_{TXL}$ is at the bottom of the full transmit passband 28, and a highest transmit passband frequency $F_{TXH}$ is at the top of the full transmit passband 28. A lowest receive passband frequency $F_{RXL}$ is at the bottom of the full receive passband 32, and a highest receive passband frequency $F_{RXH}$ is at the top of the full receive passband 32. If the duplex gap 34 is small, then practical receive and transmit bandpass filters 12, 14 may vary from ideal bandpass filter responses sufficiently to impact filter operation. Such variances may be caused by multiple factors, including manufacturing tolerances, temperature drift, aging, other factors, or any combination thereof. FIG. 2B is a graph showing a downward shifted transmit bandpass filter response curve 36, which may be caused by any of the multiple factors listed above. At the highest transmit passband frequency $F_{TXH}$, the transmit bandpass filter 14 introduces additional insertion loss 38 into the transmit path, which may reduce output power, transmitter efficiency, or both.

Figure 3:
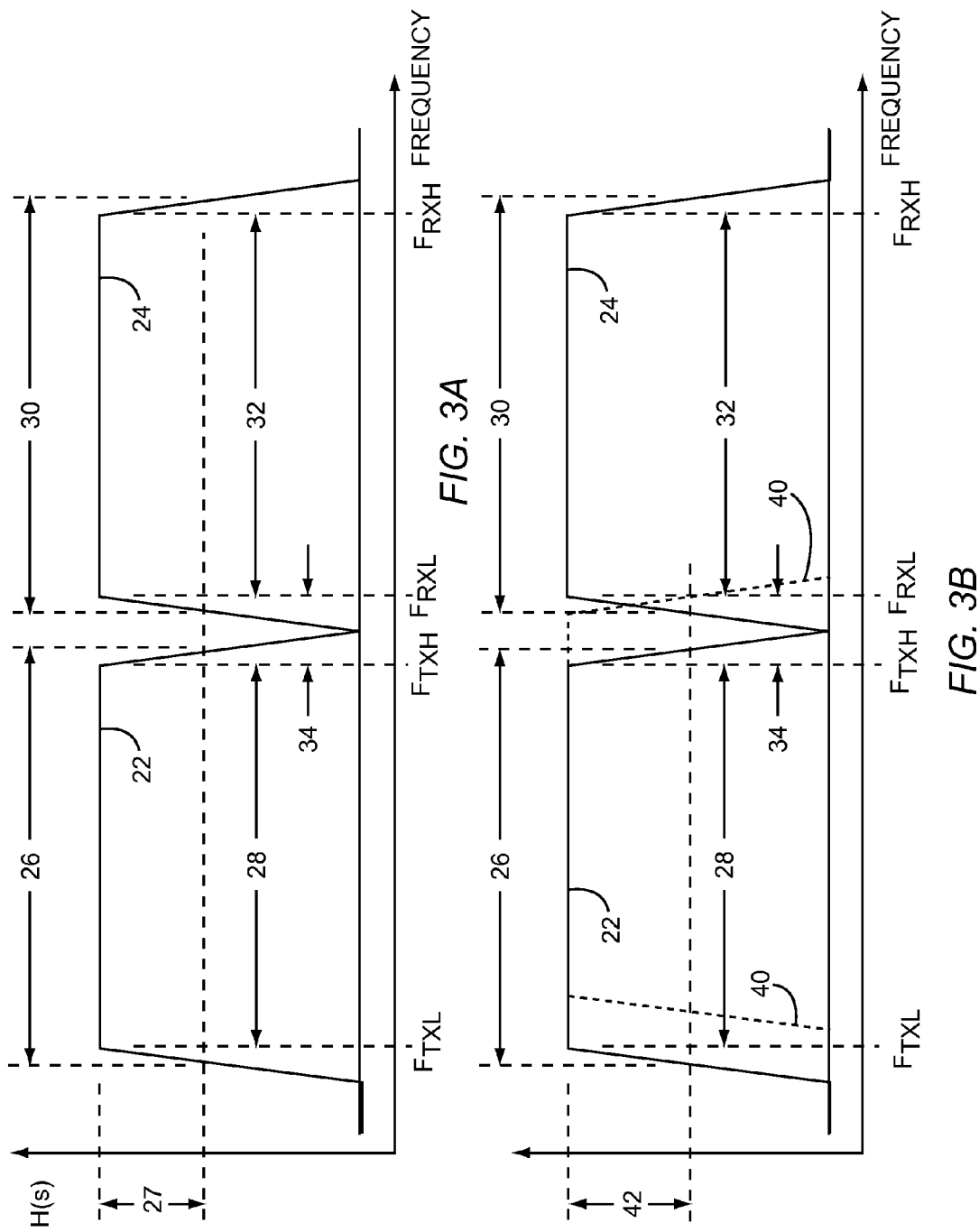
FIGS. 3A and 3B are graphs comparing the ideal transmit and receive bandpass filter response curves for an RF duplexer with an upward shifted transmit bandpass filter response curve.

FIG. 3A is a graph showing the ideal transmit and receive bandpass filter response curves 22, 24 for an RF duplexer as illustrated in FIG. 2A. FIG. 3B is a graph showing an upward shifted transmit bandpass filter response curve 40, which may be caused by manufacturing tolerances, temperature drift, aging, other factors, or any combination thereof. At the lowest receive passband frequency $F_{RXL}$, the transmit bandpass filter 14 has degraded transmit isolation 42, which may allow transmit noise to enter the receive path and desensitize the receiver.

Figure 4:
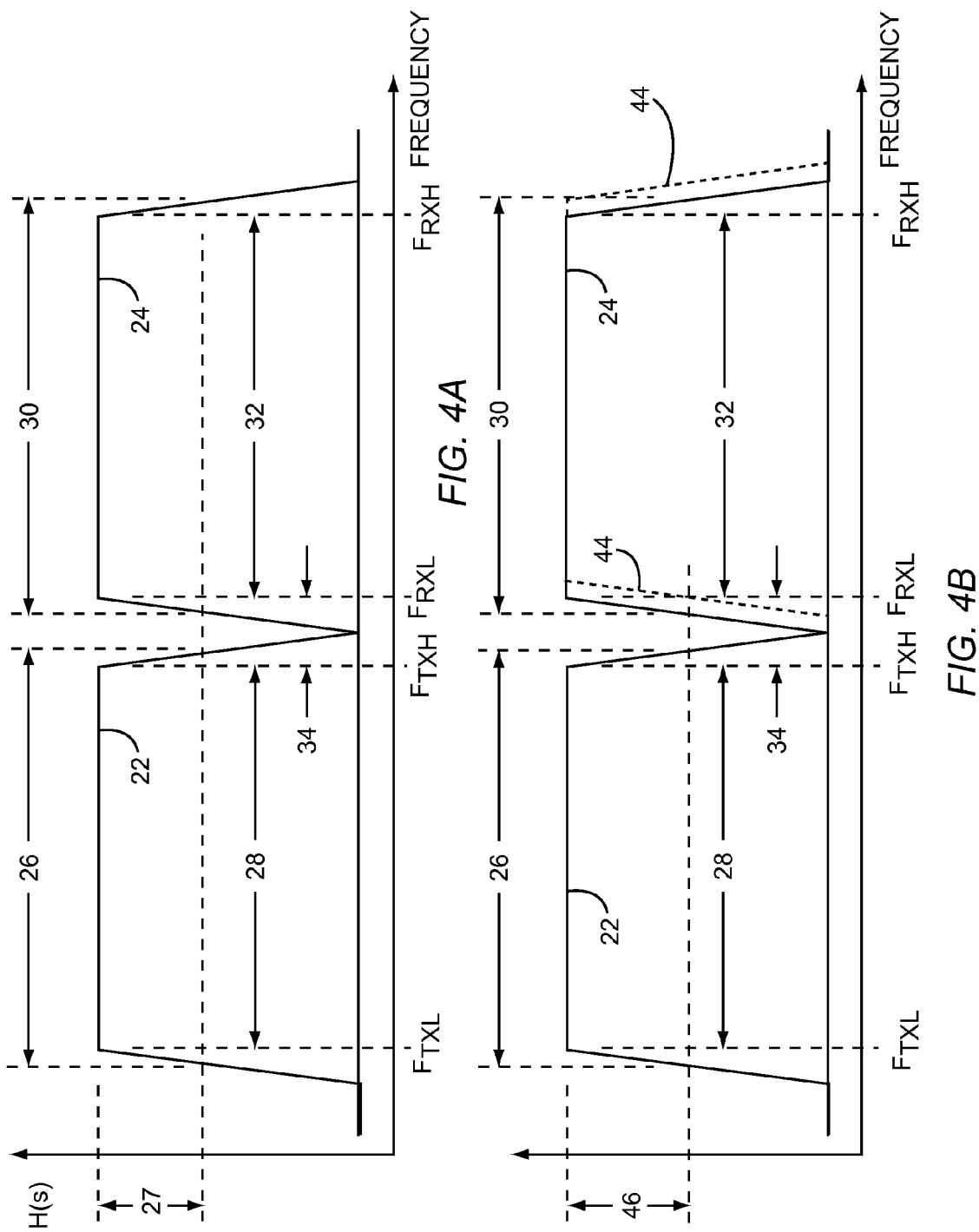
FIGS. 4A and 4B are graphs comparing the ideal transmit and receive bandpass filter response curves for an RF duplexer with an upward shifted receive bandpass filter response curve.

FIG. 4A is a graph showing the ideal transmit and receive bandpass filter response curves 22, 24 for an RF duplexer as illustrated in FIG. 2A. FIG. 4B is a graph showing an upward shifted receive bandpass filter response curve 44, which may be caused by manufacturing tolerances, temperature drift, aging, other factors, or any combination thereof. At the lowest receive passband frequency $F_{RXL}$, the receive bandpass filter 12 suffers additional insertion loss 46, which may degrade receiver sensitivity.

The present disclosure relates to a split band duplexer architecture that takes advantage of a relationship between a frequency division duplex (FDD) transmit band, an FDD receive band, and a time division duplex (TDD) band, which has frequencies located between FDD transmit band frequencies and FDD receive band frequencies. As such, by splitting the FDD receive and transmit bands into two sub-bands, two separate sub-band duplexers may be used to fully support the FDD receive and transmit bands. Further, a passband of one of the sub-band duplexers may be widened to support the TDD band while transmitting, and a passband of the other of the sub-band duplexers may be widened to support the TDD band while receiving. By using sub-band duplexers, isolation margins and insertion loss margins may be increased, which may allow use of standard filter components, such as surface acoustic wave (SAW) filters, and their accompanying manufacturing tolerances and drift characteristics.

Figure 5:
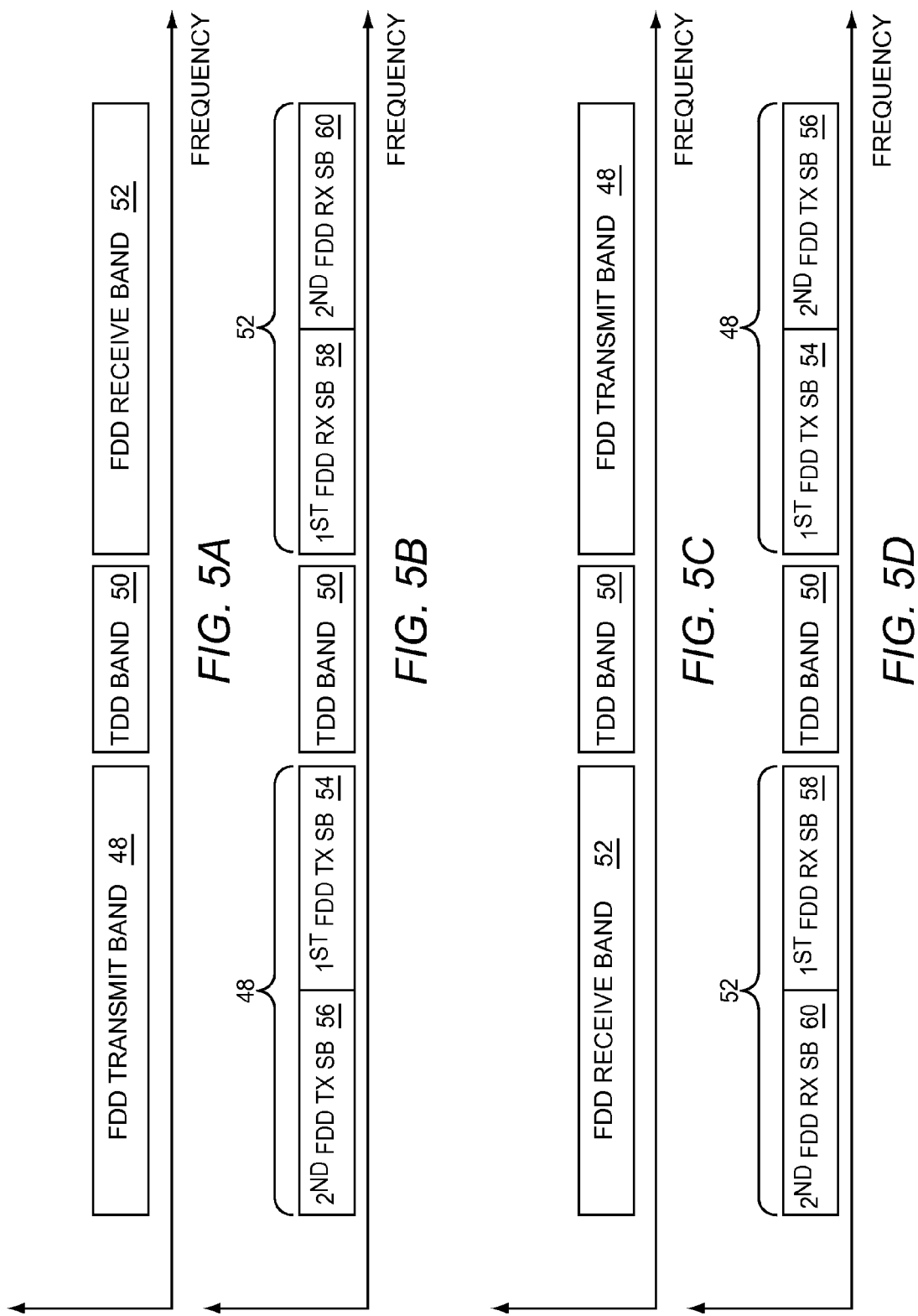
FIG. 5A is a graph showing a frequency distribution of a frequency division duplex (FDD) transmit band, a time division duplex (TDD) band, and an FDD receive band that are associated with RF circuitry according to one embodiment of the FDD transmit band, the TDD band, and the FDD receive band.
FIG. 5B is a graph showing details of the FDD transmit band, the TDD band, and the FDD receive band illustrated in FIG. 5A according to an exemplary embodiment of the FDD transmit band, the TDD band 50, and the FDD receive band.
FIG. 5C is a graph showing a frequency distribution of the FDD transmit band, the TDD band, and the FDD receive band that are associated with the RF circuitry according to an alternate embodiment of the FDD transmit band, the TDD band, and the FDD receive band.
FIG. 5D is a graph showing details of the FDD transmit band, the TDD band, and the FDD receive band illustrated in FIG. 5C according to an exemplary embodiment of the FDD transmit band, the TDD band, and the FDD receive band.

FIG. 5A is a graph showing a frequency distribution of an FDD transmit band 48, a TDD band 50, and an FDD receive band 52 that are associated with RF circuitry 62 (FIG. 6) according to one embodiment of the FDD transmit band 48, the TDD band 50, and the FDD receive band 52. In different operating modes the RF circuitry 62 may transmit RF signals in the FDD transmit band 48, in the TDD band 50, or both, and the RF circuitry 62 may receive RF signals in the FDD receive band 52, in the TDD band 50, or both, according to one embodiment of the RF circuitry 62. As illustrated, frequencies in the FDD transmit band 48 are less than frequencies in the FDD receive band 52. Further, frequencies in the TDD band 50 are between the frequencies in the FDD transmit band 48 and the frequencies in the FDD receive band 52.

FIG. 5B is a graph showing details of the FDD transmit band 48 and the FDD receive band 52 illustrated in FIG. 5A according to an exemplary embodiment of the FDD transmit band 48 and the FDD receive band 52. The FDD transmit band 48 includes a first FDD transmit sub-band 54 and a second FDD transmit sub-band 56. The FDD receive band 52 includes a first FDD receive sub-band 58 and a second FDD receive sub-band 60. Frequencies in the first FDD transmit sub-band 54 may be between frequencies in the second FDD transmit sub-band 56 and the frequencies in the TDD band 50. Frequencies in the first FDD receive sub-band 58 may be between frequencies in the second FDD receive sub-band 60 and the frequencies in the TDD band 50. A bandwidth of the first FDD transmit sub-band 54 may be about equal to a bandwidth of the second FDD transmit sub-band 56. A bandwidth of the first FDD receive sub-band 58 may be about equal to a bandwidth of the second FDD receive sub-band 60.

FIG. 5C is a graph showing a frequency distribution of the FDD transmit band 48, the TDD band 50, and the FDD receive band 52 that are associated with the RF circuitry 62 (FIG. 6) according to an alternate embodiment of the FDD transmit band 48, the TDD band 50, and the FDD receive band 52. In different operating modes the RF circuitry 62 may transmit RF signals in the FDD transmit band 48, in the TDD band 50, or both, and the RF circuitry 62 may receive RF signals in the FDD receive band 52, in the TDD band 50, or both, according to one embodiment of the RF circuitry 62. As illustrated, frequencies in the FDD transmit band 48 are greater than frequencies in the FDD receive band 52. Further, frequencies in the TDD band 50 are between the frequencies in the FDD transmit band 48 and the frequencies in the FDD receive band 52.

FIG. 5D is a graph showing details of the FDD transmit band 48, the TDD band 50, and the FDD receive band 52 illustrated in FIG. 5C according to an exemplary embodiment of the FDD transmit band 48, the TDD band 50, and the FDD receive band 52. The FDD transmit band 48 includes the first FDD transmit sub-band 54 and the second FDD transmit sub-band 56. The FDD receive band 52 includes the first FDD receive sub-band 58 and the second FDD receive sub-band 60. Frequencies in the first FDD transmit sub-band 54 may be between frequencies in the second FDD transmit sub-band 56 and the frequencies in the TDD band 50. Frequencies in the first FDD receive sub-band 58 may be between frequencies in the second FDD receive sub-band 60 and the frequencies in the TDD band 50. A bandwidth of the first FDD transmit sub-band 54 may be about equal to a bandwidth of the second FDD transmit sub-band 56. A bandwidth of the first FDD receive sub-band 58 may be about equal to a bandwidth of the second FDD receive sub-band 60.

Figure 6:
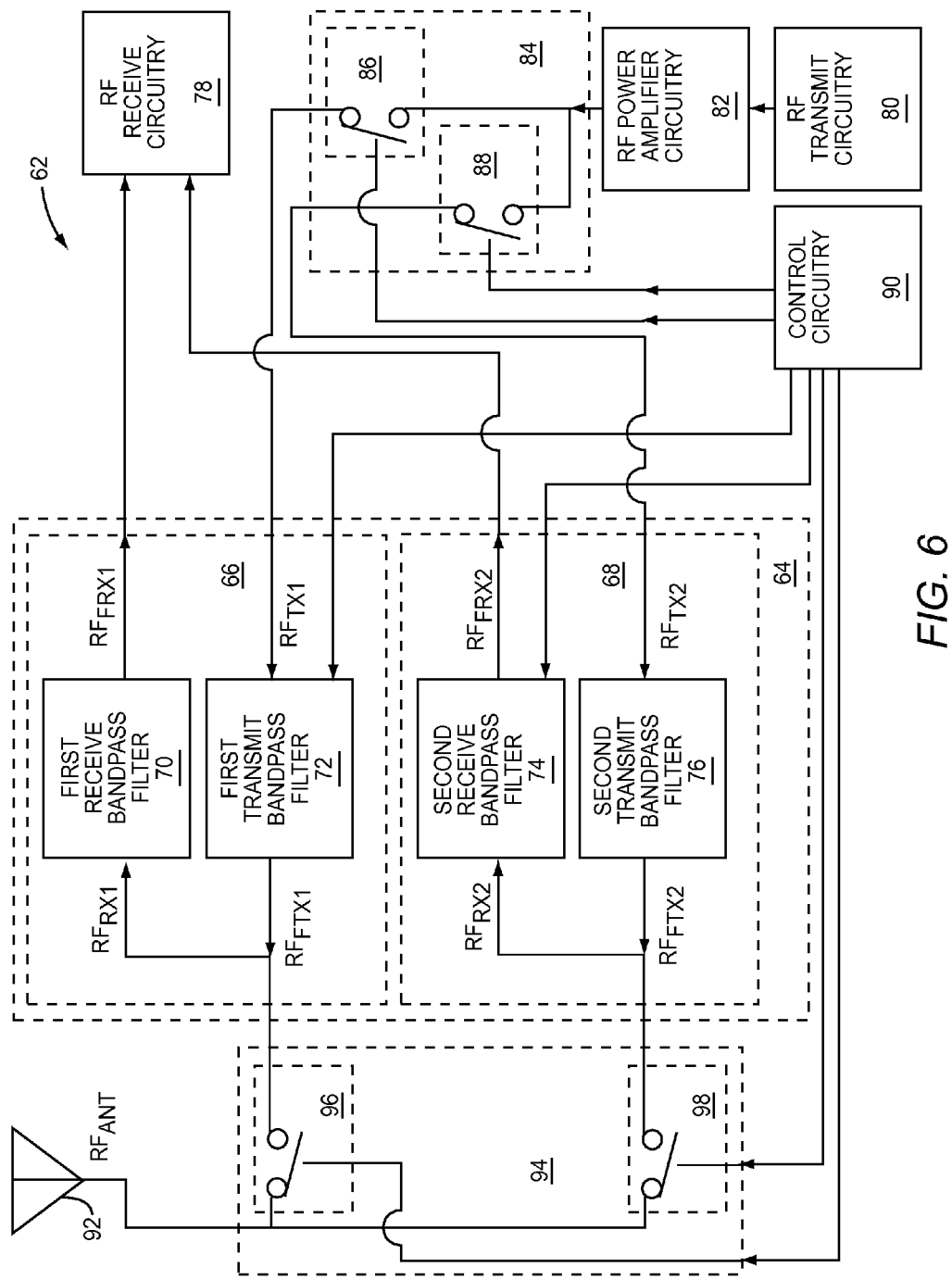
FIG. 6 shows the RF circuitry according to one embodiment of the RF circuitry.

FIG. 6 shows the RF circuitry 62 according to one embodiment of the RF circuitry 62. The RF circuitry 62 includes a split band duplexer 64, which includes a first sub-band duplexer 66 and a second sub-band duplexer 68. The first sub-band duplexer 66 includes a first receive bandpass filter 70 and a first transmit bandpass filter 72, and the second sub-band duplexer 68 includes a second receive bandpass filter 74 and a second transmit bandpass filter 76. Further, the RF circuitry 62 includes RF receive circuitry 78, RF transmit circuitry 80, RF power amplifier circuitry 82, and transmit switching circuitry 84, which includes a first transmit switch 86 and a second transmit switch 88. Additionally, the RF circuitry 62 includes control circuitry 90, an antenna 92, and antenna switching circuitry 94, which includes a first antenna switch 96 and a second antenna switch 98.

When operating, the control circuitry 90 selects one of a first FDD operating mode, a second FDD operating mode, and a TDD operating mode. The TDD operating mode may be a half-duplex operating mode, such that the RF circuitry 62 may transmit RF signals and may receive RF signals, but not simultaneously. The first and the second FDD operating modes may be full-duplex operating modes, such that the RF circuitry 62 may transmit RF signals and may receive RF signals simultaneously. During the second FDD operating mode, the first receive bandpass filter 70 receives and filters a first receive signal $RF_{RX1}$ to provide a first filtered receive signal $RF_{FRX1}$ to the RF receive circuitry 78 for further processing. During the first FDD operating mode, the second receive bandpass filter 74 receives and filters a second receive signal $RF_{RX2}$ to provide a second filtered receive signal $RF_{FRX2}$ to the RF receive circuitry 78 for further processing.

Additionally, during the TDD operating mode while receiving, the second receive bandpass filter 74 receives and filters the second receive signal $RF_{RX2}$ to provide the second filtered receive signal $RF_{FRX2}$ to the RF receive circuitry 78 for further processing.

During the second FDD operating mode, the first transmit bandpass filter 72 receives and filters a first transmit signal $RF_{TX1}$ to provide a first filtered transmit signal $RF_{FTX1}$ to the first antenna switch 96. Further, during the TDD operating mode while transmitting, the first transmit bandpass filter 72 receives and filters a first transmit signal $RF_{TX1}$ to provide a first filtered transmit signal $RF_{FTX1}$ to the first antenna switch 96. During the first FDD operating mode, the second transmit bandpass filter 76 receives and filters a second transmit signal $RF_{TX2}$ to provide a second filtered transmit signal $RF_{FTX2}$ to the second antenna switch 98.

In general, during the second FDD operating mode, the first sub-band duplexer 66 receives and filters the first receive signal $RF_{RX1}$ to provide the first filtered receive signal $RF_{FRX1}$ to the RF receive circuitry 78 for further processing. As such, during the second FDD operating mode, the RF receive circuitry 78 receives the first filtered receive signal $RF_{FRX1}$. During the first FDD operating mode and during the TDD operating mode while receiving, the second sub-band duplexer 68 receives and filters the second receive signal $RF_{RX2}$ to provide the second filtered receive signal $RF_{FRX2}$ to the RF receive circuitry 78 for further processing. As such, during the first FDD operating mode and during the TDD operating mode while receiving, the RF receive circuitry 78 receives the second filtered receive signal $RF_{FRX2}$. During the second FDD operating mode and during the TDD operating mode while transmitting, the first sub-band duplexer 66 receives and filters the first transmit signal $RF_{TX1}$ to provide the first filtered transmit signal $RF_{FTX1}$ to the first antenna switch 96. During the first FDD operating mode, second sub-band duplexer 68 receives and filters the second transmit signal $RF_{TX2}$ to provide the second filtered transmit signal $RF_{FTX2}$ to the second antenna switch 98.

The antenna 92 is coupled to the first and second antenna switches 96, 98 and provides or receives an antenna signal $RF_{ANT}$ to or from the first and second antenna switches 96, 98, respectively. The first antenna switch 96 is coupled between the first receive bandpass filter 70 and the antenna 92, and the first antenna switch 96 is coupled between the first transmit bandpass filter 72 and the antenna 92. In general, the antenna switching circuitry 94 is coupled between the first receive bandpass filter 70 and the antenna 92, and the antenna switching circuitry 94 is coupled between the first transmit bandpass filter 72 and the antenna 92. The second antenna switch 98 is coupled between the second receive bandpass filter 74 and the antenna 92, and the second antenna switch 98 is coupled between the second transmit bandpass filter 76 and the antenna 92. In general, the antenna switching circuitry 94 is coupled between the second receive bandpass filter 74 and the antenna 92, and the antenna switching circuitry 94 is coupled between the second transmit bandpass filter 76 and the antenna 92.

The control circuitry 90 is coupled to and selects either an OPEN state or a CLOSED state of the first antenna switch 96 and is coupled to and selects either an OPEN state or a CLOSED state of the second antenna switch 98. During the TDD operating mode while transmitting and during the second FDD operating mode, the first antenna switch 96 is in the CLOSED state and the second antenna switch 98 is in the OPEN state, such that the antenna switching circuitry 94 electrically couples the first transmit bandpass filter 72 to the antenna 92, the antenna switching circuitry 94 electrically couples the first receive bandpass filter 70 to the antenna 92, the antenna switching circuitry 94 electrically isolates the second transmit bandpass filter 76 from the antenna 92, and the antenna switching circuitry 94 electrically isolates the second receive bandpass filter 74 from the antenna 92. As such, during the TDD operating mode while transmitting, the first filtered transmit signal $RF_{FTX1}$ may provide the antenna signal $RF_{ANT}$, and during the second FDD operating mode, the antenna signal $RF_{ANT}$ may provide the first receive signal $RF_{RX1}$ and the first filtered transmit signal $RF_{FTX1}$ may provide part of the antenna signal $RF_{ANT}$.

During the TDD operating mode while receiving and during the first FDD operating mode, the first antenna switch 96 is in the OPEN state and the second antenna switch 98 is in the CLOSED state, such that the antenna switching circuitry 94 electrically isolates the first transmit bandpass filter 72 from the antenna 92, the antenna switching circuitry 94 electrically isolates the first receive bandpass filter 70 from the antenna 92, the antenna switching circuitry 94 electrically couples the second transmit bandpass filter 76 to the antenna 92, and the antenna switching circuitry 94 electrically couples the second receive bandpass filter 74 to the antenna 92. As such, during the TDD operating mode while receiving, the antenna signal $RF_{ANT}$ may provide the second receive signal $RF_{RX2}$, and during the first FDD operating mode, the antenna signal $RF_{ANT}$ may provide the second receive signal $RF_{RX2}$ and the second filtered transmit signal $RF_{FTX2}$ may provide part of the antenna signal $RF_{ANT}$.

The RF transmit circuitry 80 feeds the RF power amplifier circuitry 82, which receives and amplifies RF signals from the RF transmit circuitry 80 to provide RF transmit signals to the first transmit bandpass filter 72 or to the second transmit bandpass filter 76. Specifically, the first transmit switch 86 is coupled between the RF power amplifier circuitry 82 and the first transmit bandpass filter 72, and the second transmit switch 88 is coupled between the RF power amplifier circuitry 82 and the second transmit bandpass filter 76. In general, the transmit switching circuitry 84 is coupled between the RF power amplifier circuitry 82 and the first transmit bandpass filter 72 and the transmit switching circuitry 84 is coupled between the RF power amplifier circuitry 82 and the second transmit bandpass filter 76.

The control circuitry 90 is coupled to and selects either an OPEN state or a CLOSED state of the first transmit switch 86 and is coupled to and selects either an OPEN state or a CLOSED state of the second transmit switch 88. During the TDD operating mode while transmitting and during the second FDD operating mode, the first transmit switch 86 is in the CLOSED state and the second transmit switch 88 is in the OPEN state, such that the transmit switching circuitry 84 electrically couples the first transmit bandpass filter 72 to the RF power amplifier circuitry 82 and the transmit switching circuitry 84 electrically isolates the second transmit bandpass filter 76 from the RF power amplifier circuitry 82. As such, during the TDD operating mode while transmitting, the RF power amplifier circuitry 82 may provide the first transmit signal $RF_{TX1}$, and during the second FDD operating mode, the RF power amplifier circuitry 82 may provide the first transmit signal $RF_{TX1}$.

During first FDD operating mode, the first transmit switch 86 is in the OPEN state and the second transmit switch 88 is in the CLOSED state, such that the transmit switching circuitry 84 electrically isolates the first transmit bandpass filter 72 from the RF power amplifier circuitry 82 and the transmit switching circuitry 84 electrically couples the second transmit bandpass filter 76 to the RF power amplifier circuitry 82.

As such, during the first FDD operating mode, the RF power amplifier circuitry 82 may provide the second transmit signal $RF_{TX2}$.

The first antenna switch 96, the second antenna switch 98, or both may include at least one Micro-Electro-Mechanical Systems (MEMS) switch. In general, the antenna switching circuitry 94 may include at least one MEMS switch to provide good RF isolation. Further, the first transmit switch 86, the second transmit switch 88, or both may include at least one MEMS switch. In general, the transmit switching circuitry 84 may include at least one MEMS switch for isolation.

At least one of the first receive bandpass filter 70, the first transmit bandpass filter 72, the second receive bandpass filter 74, and the second transmit bandpass filter 76 may include at least one surface acoustic wave (SAW) filter. In one embodiment of the first transmit bandpass filter 72 and the second receive bandpass filter 74, passbands of the first transmit bandpass filter 72, the second receive bandpass filter 74, or both are tunable. As such, the control circuitry 90 may be coupled to the first transmit bandpass filter 72, the second receive bandpass filter 74, or both to select at least one of the passbands. In alternate embodiments of the RF circuitry 62, the RF circuitry 62 may not provide any or all of the RF receive circuitry 78, the RF transmit circuitry 80, the RF power amplifier circuitry 82, the transmit switching circuitry 84, the antenna 92, and the antenna switching circuitry 94.

Figure 7:
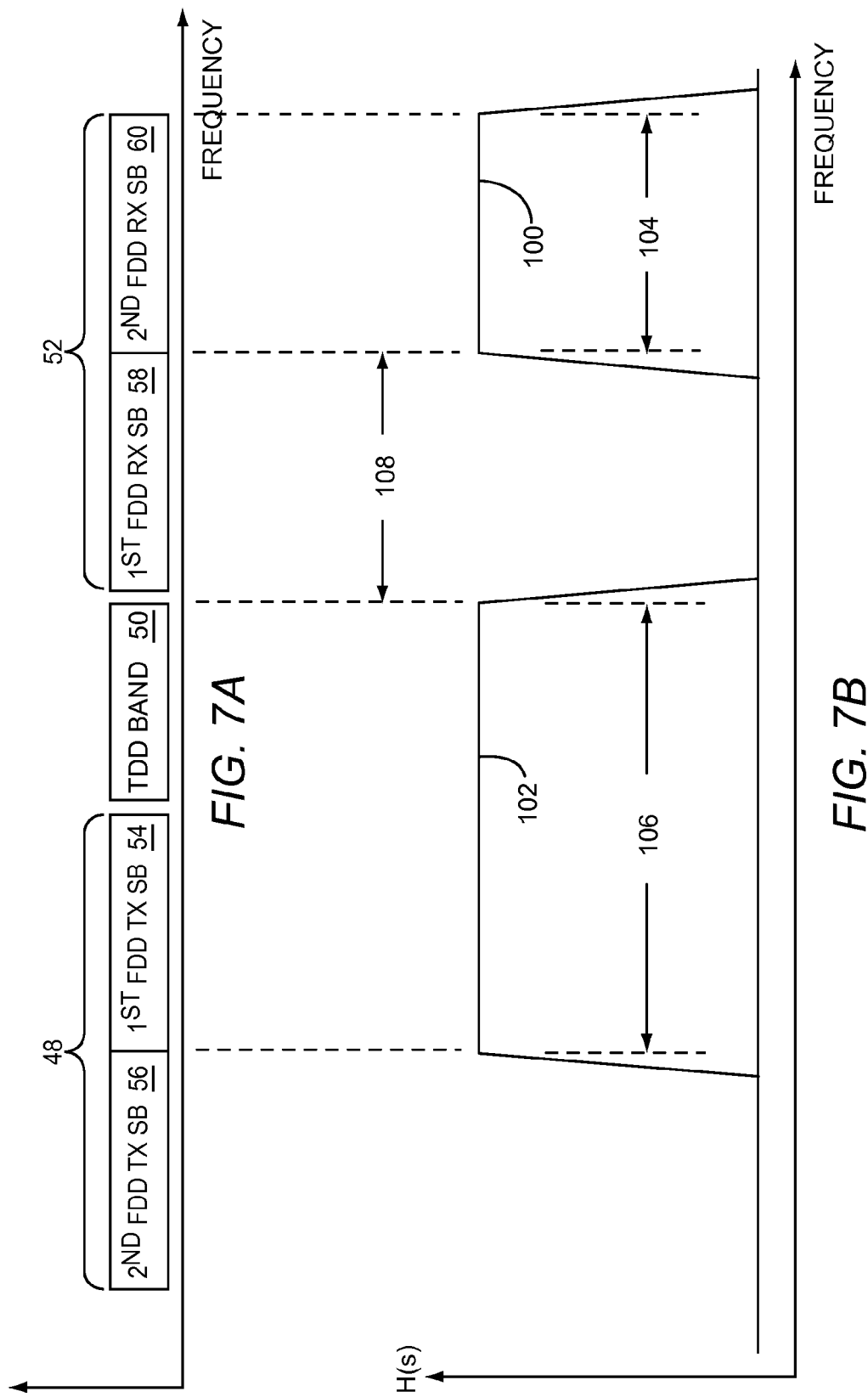
FIG. 7A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.
FIG. 7B is a graph showing a first receive bandpass filter response curve and a first transmit bandpass filter response curve according to one embodiment of the RF circuitry.

FIG. 7A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

FIG. 7B is a graph showing a first receive bandpass filter response curve 100 and a first transmit bandpass filter response curve 102 according to one embodiment of the RF circuitry 62. The first receive bandpass filter response curve 100 is associated with the first receive bandpass filter 70, which during the second FDD operating mode has a first receive passband 104. Further, during the second FDD operating mode, the first filtered receive signal $RF_{FRX1}$ falls within the first receive passband 104. The first transmit bandpass filter response curve 102 is associated with the first transmit bandpass filter 72, which during the second FDD operating mode and during the TDD operating mode while transmitting has a first transmit passband 106. Further, during the second FDD operating mode and during the TDD operating mode while transmitting, the first filtered transmit signal $RF_{FTX1}$ falls within the first transmit passband 106. The first transmit passband 106 is separated from the first receive passband 104 by a band separation 108, which may be large enough to relax design constraints of the first receive bandpass filter 70 and the first transmit bandpass filter 72. During the TDD operating mode while transmitting, the first transmit passband 106 spans the first FDD transmit sub-band 54 and the TDD band 50.

Figure 8:
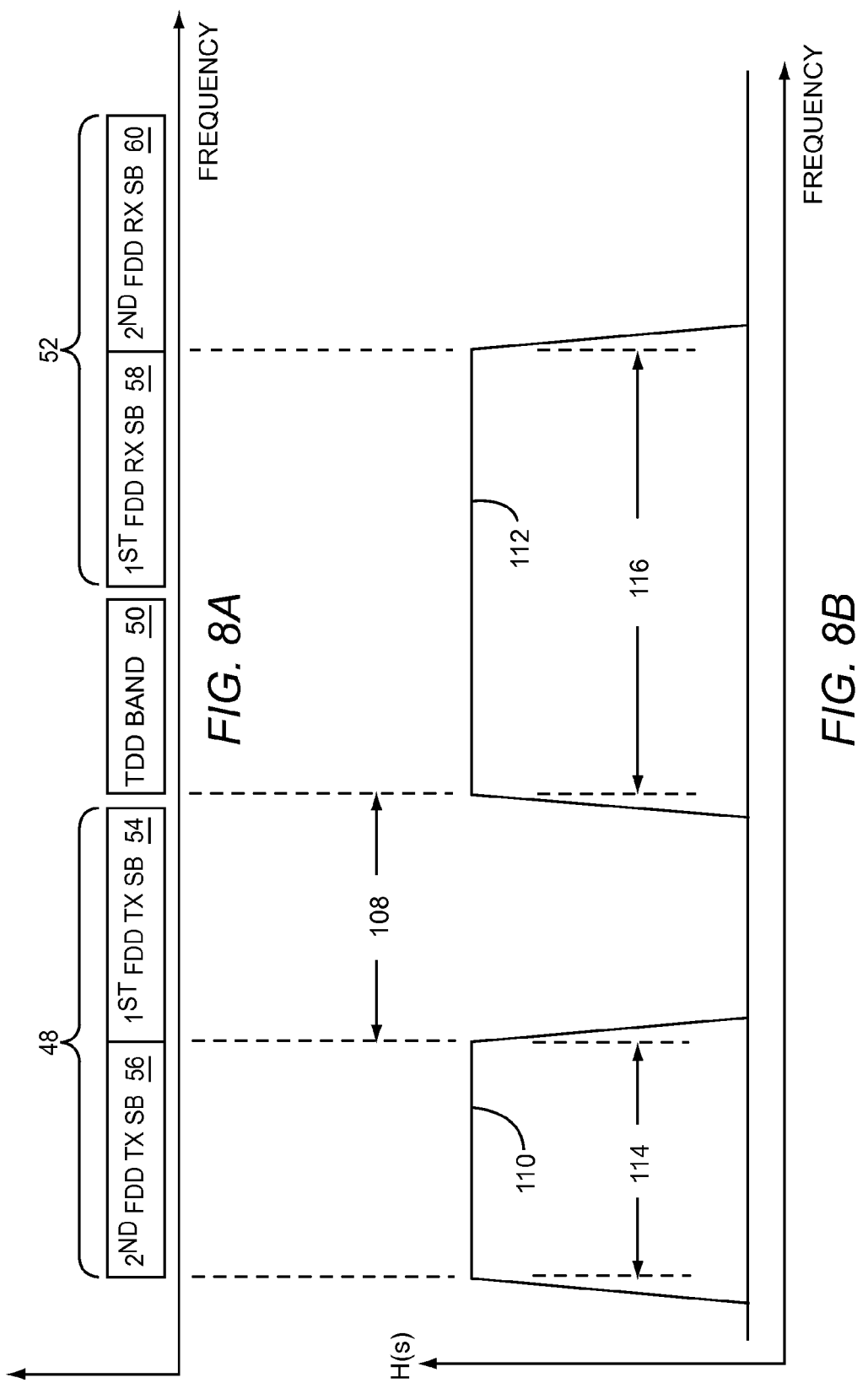
FIG. 8A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.
FIG. 8B is a graph showing a second transmit bandpass filter response curve and a second receive bandpass filter response curve according to one embodiment of the RF circuitry.

FIG. 8A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

FIG. 8B is a graph showing a second transmit bandpass filter response curve 110 and a second receive bandpass filter response curve 112 according to one embodiment of the RF circuitry 62. The second transmit bandpass filter response curve 110 is associated with the second transmit bandpass filter 76, which during the first FDD operating mode has a second transmit passband 114. Further, during the first FDD operating mode, the second filtered transmit signal $RF_{FTX2}$ falls within the second transmit passband 114. The second receive bandpass filter response curve 112 is associated with the second receive bandpass filter 74, which during the first FDD operating mode and during the TDD operating mode while receiving has a second receive passband 116. Further, during the first FDD operating mode and during the TDD operating mode while receiving, the second filtered receive signal $RF_{FRX2}$ falls within the second receive passband 116. The second transmit passband 114 is separated from the second receive passband 116 by the band separation 108, which may be large enough to relax design constraints of the second receive bandpass filter 74 and the second transmit bandpass filter 76. During the TDD operating mode while receiving, the second receive passband 116 spans the first FDD receive sub-band 58 and the TDD band 50. A combination of the first transmit passband 106 and the second transmit passband 114 span the FDD transmit band 48, and a combination of the first receive passband 104 and the second receive passband 116 span the FDD receive band 52.

Figure 9:
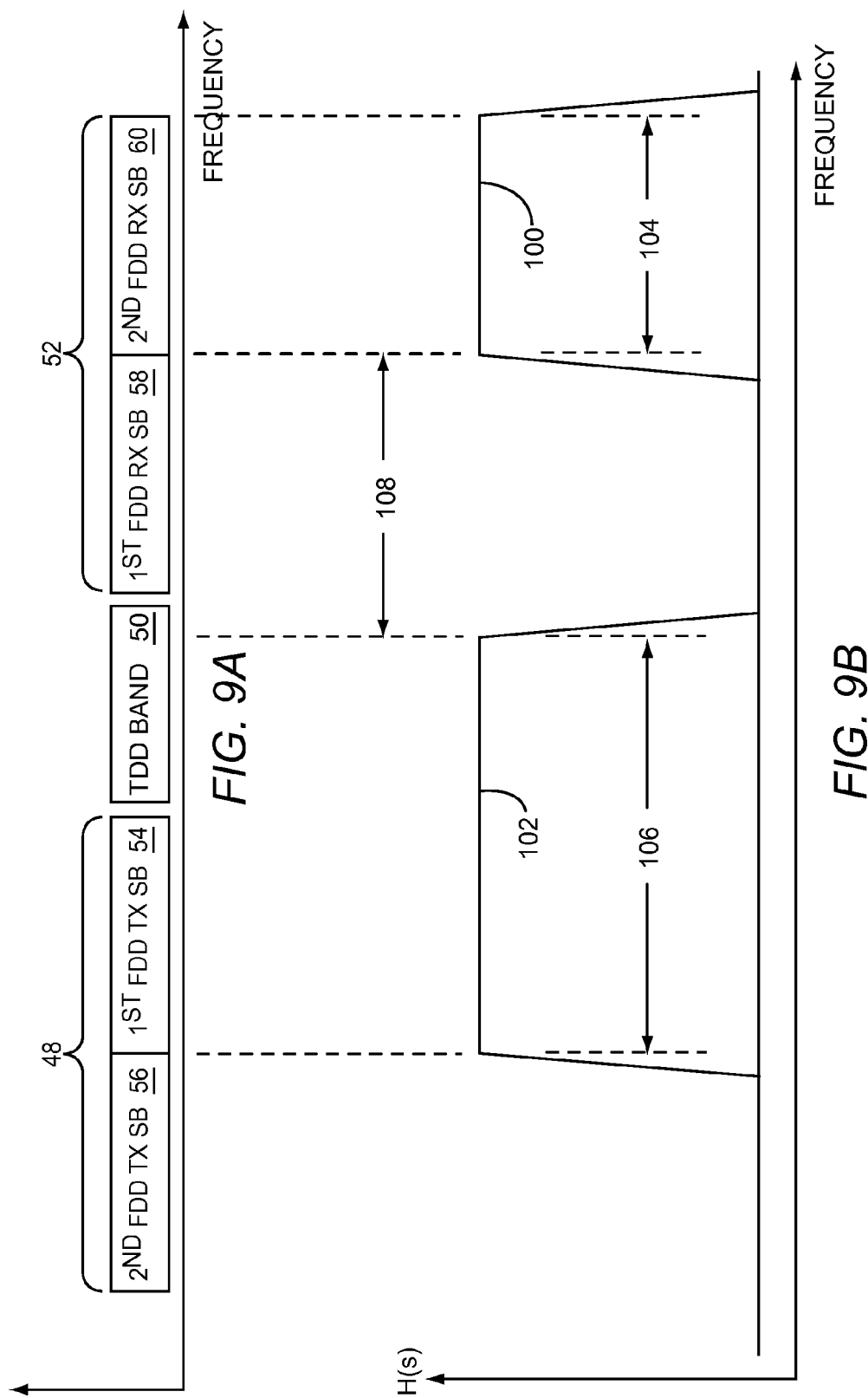
FIG. 9A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.
FIG. 9B is a graph showing the first receive bandpass filter response curve and the first transmit bandpass filter response curve according to an alternate embodiment of the RF circuitry.

FIG. 9A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

FIG. 9B is a graph showing the first receive bandpass filter response curve 100 and the first transmit bandpass filter response curve 102 according to an alternate embodiment of the RF circuitry 62. In the RF circuitry 62 associated with FIG. 9B, the first transmit bandpass filter 72 is tunable. As such, the first transmit passband 106 is wider during the TDD operating mode while transmitting than the first transmit passband 106 is during the second FDD operating mode. The first transmit passband 106 illustrated in FIG. 7B shows the first transmit passband 106 during the TDD operating mode while transmitting, whereas the first transmit passband 106 illustrated in FIG. 9B shows the first transmit passband 106 during the second FDD operating mode. The first transmit passband 106 illustrated in FIG. 7B spans the TDD band 50, whereas the first transmit passband 106 illustrated in FIG. 9B does not span the TDD band 50, since frequencies in the TDD band 50 are not used during the second FDD operating mode. In this regard, the band separation 108 may be further increased during the second FDD operating mode, which may further relax design constraints of the first transmit bandpass filter 72.

Figure 10:
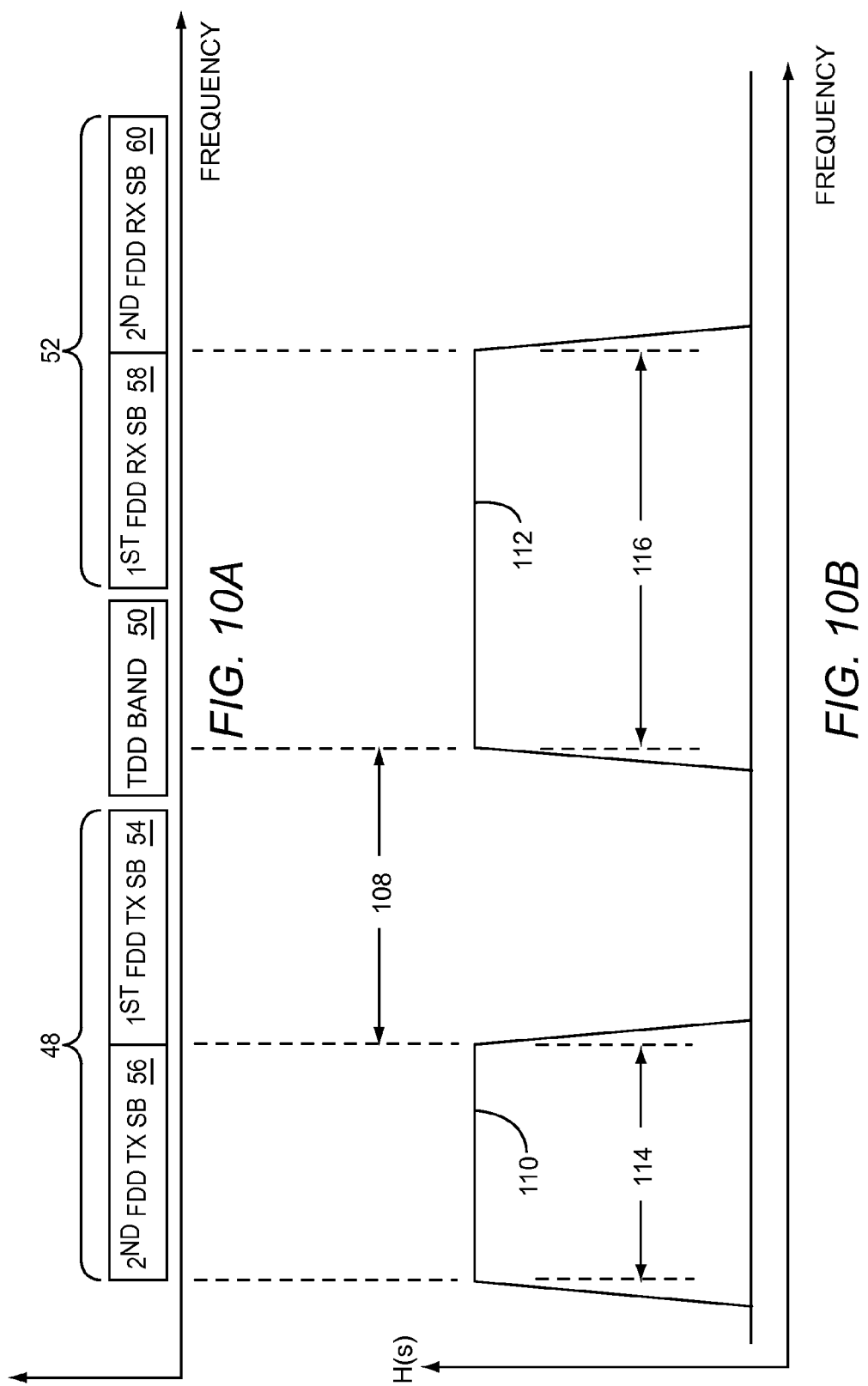
FIG. 10A is a duplicate of FIG. 5B and shows the first FDD transmit sub-band, the second FDD transmit sub-band, the first FDD receive sub-band, the second FDD receive sub-band, and the TDD band according to one embodiment of the RF circuitry.
FIG. 10B is a graph showing the second transmit bandpass filter response curve and the second receive bandpass filter response curve according to an alternate embodiment of the RF circuitry.

FIG. 10A is a duplicate of FIG. 5B and shows the first FDD transmit sub-band 54, the second FDD transmit sub-band 56, the first FDD receive sub-band 58, the second FDD receive sub-band 60, and the TDD band 50 according to one embodiment of the RF circuitry 62.

FIG. 10B is a graph showing the second transmit bandpass filter response curve 110 and the second receive bandpass filter response curve 112 according to an alternate embodiment of the RF circuitry 62. In the RF circuitry 62 associated with FIG. 10B, the second receive bandpass filter 74 is tunable. As such, the second receive passband 116 is wider during the TDD operating mode while receiving than the second receive passband 116 is during the first FDD operating mode. The second receive passband 116 illustrated in FIG. 8B shows the second receive passband 116 during the TDD operating mode while receiving, whereas the second receive passband 116 illustrated in FIG. 10B shows the second receive passband 116 during the first FDD operating mode. The second receive passband 116 illustrated in FIG. 8B spans the TDD band 50, whereas the second receive passband 116 illustrated in FIG. 10B does not span the TDD band 50, since frequencies in the TDD band 50 are not used during the first FDD operating mode. In this regard, the band separation 108 may be further increased during the first FDD operating mode, which may further relax design constraints of the second receive bandpass filter 74.

Figure 11:
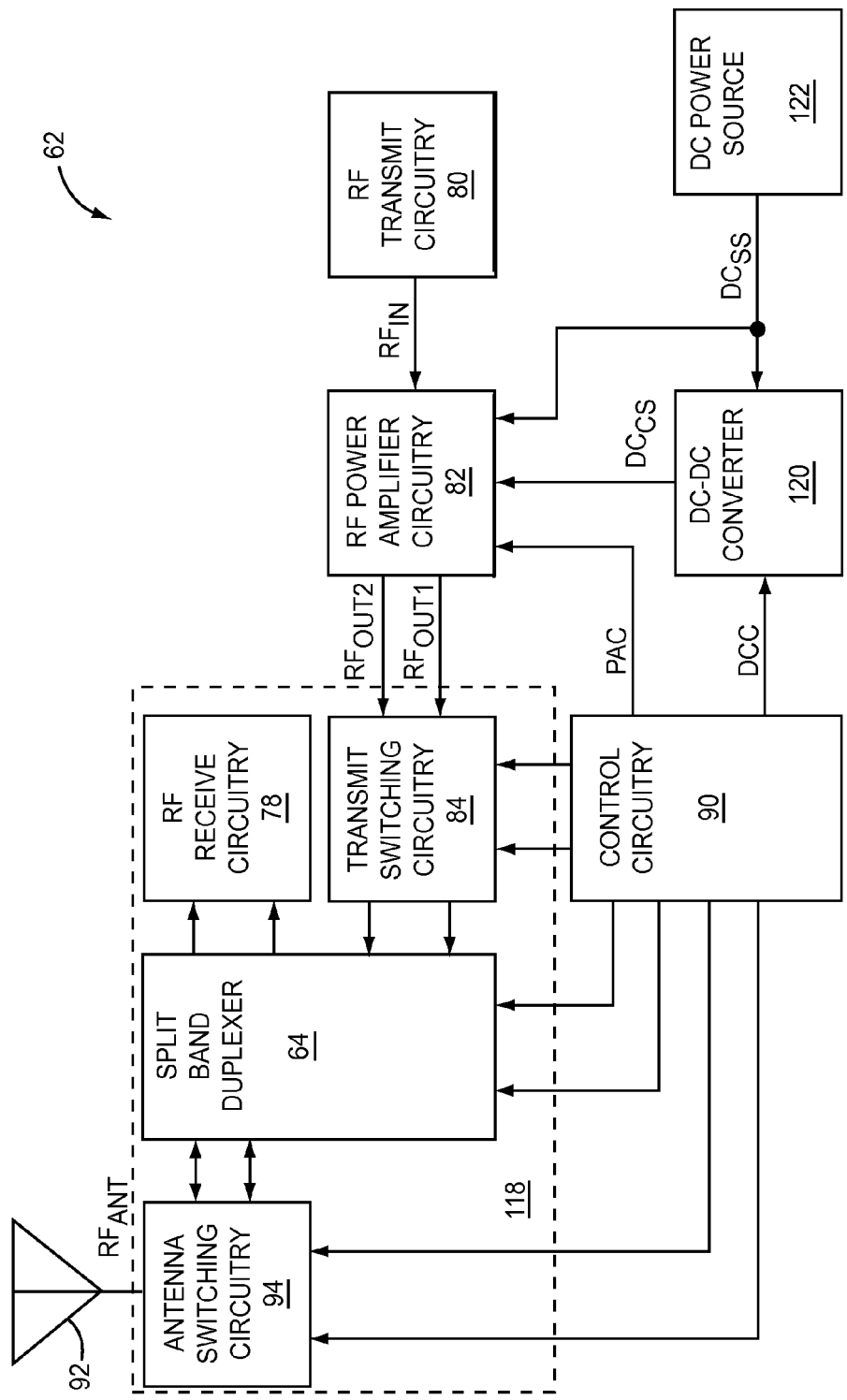
FIG. 11 shows the RF circuitry according to an alternate embodiment of the RF circuitry.

FIG. 11 shows the RF circuitry 62 according to an alternate embodiment of the RF circuitry 62. The RF circuitry 62 illustrated in FIG. 11 is similar to the RF circuitry 62 illustrated in FIG. 6, except the RF circuitry 62 illustrated in FIG. 11 further includes RF front-end circuitry 118, a DC-DC converter 120, and a DC power source 122. The RF front-end circuitry 118 includes the split band duplexer 64, the RF receive circuitry 78, the transmit switching circuitry 84, and the antenna switching circuitry 94. Alternate embodiments of the RF front-end circuitry 118 may omit any or all of the split band duplexer 64, the RF receive circuitry 78, the transmit switching circuitry 84, and the antenna switching circuitry 94. Further, additional embodiments of the RF front-end circuitry 118 may include various RF components, including RF switches; RF filters, such as bandpass filters, harmonic filters, and duplexers; RF amplifiers, such as low noise amplifiers (LNAs); impedance matching circuitry; the like; or any combination thereof.

In one embodiment of the RF circuitry 62, the RF transmit circuitry 80 provides an RF input signal $RF_{IN}$ to the RF power amplifier circuitry 82. The DC power source 122 provides a DC source signal $DC_{SS}$ to the RF power amplifier circuitry 82 and to the DC-DC converter 120. Further, the control circuitry 90 provides a DC-DC converter control signal DCC to the DC-DC converter 120 and provides a PA control signal PAC to the RF power amplifier circuitry 82. The DC-DC converter 120 provides a DC-DC converter supply signal $DC_{CS}$ to the RF power amplifier circuitry 82 based on a DC-DC conversion of the DC source signal $DC_{SS}$. In one embodiment of the RF power amplifier circuitry 82, the RF power amplifier circuitry 82 receives and amplifies the RF input signal $RF_{IN}$ to provide a first RF output signal $RF_{OUT1}$ to the RF front-end circuitry 118. In one embodiment of the RF power amplifier circuitry 82, the RF power amplifier circuitry 82 receives and amplifies the RF input signal $RF_{IN}$ to provide a second RF output signal $RF_{OUT2}$ to the RF front-end circuitry 118.

In an exemplary embodiment of the RF power amplifier circuitry 82, the RF power amplifier circuitry 82 receives and amplifies the RF input signal $RF_{IN}$ to provide a first RF output signal $RF_{OUT1}$ to the transmit switching circuitry 84. In an exemplary embodiment of the RF power amplifier circuitry 82, the RF power amplifier circuitry 82 receives and amplifies the RF input signal $RF_{IN}$ to provide a second RF output signal $RF_{OUT2}$ to the transmit switching circuitry 84.

In one embodiment of the RF power amplifier circuitry 82, the RF power amplifier circuitry 82 uses the DC-DC converter supply signal $DC_{CS}$ to provide power for amplification. In an alternate embodiment of the RF power amplifier circuitry 82, the RF power amplifier circuitry 82 uses the DC source signal $DC_{SS}$ to provide power for amplification. In another embodiment of the RF power amplifier circuitry 82, the RF power amplifier circuitry 82 uses both the DC-DC converter supply signal $DC_{CS}$ and the DC source signal $DC_{SS}$ to provide power for amplification. In one embodiment of the DC-DC converter 120, configuration of the DC-DC converter 120 is based on the DC-DC converter control signal DCC. In one embodiment of the RF power amplifier circuitry 82, configuration of the RF power amplifier circuitry 82 is based on the PA control signal PAC.

Figure 12:
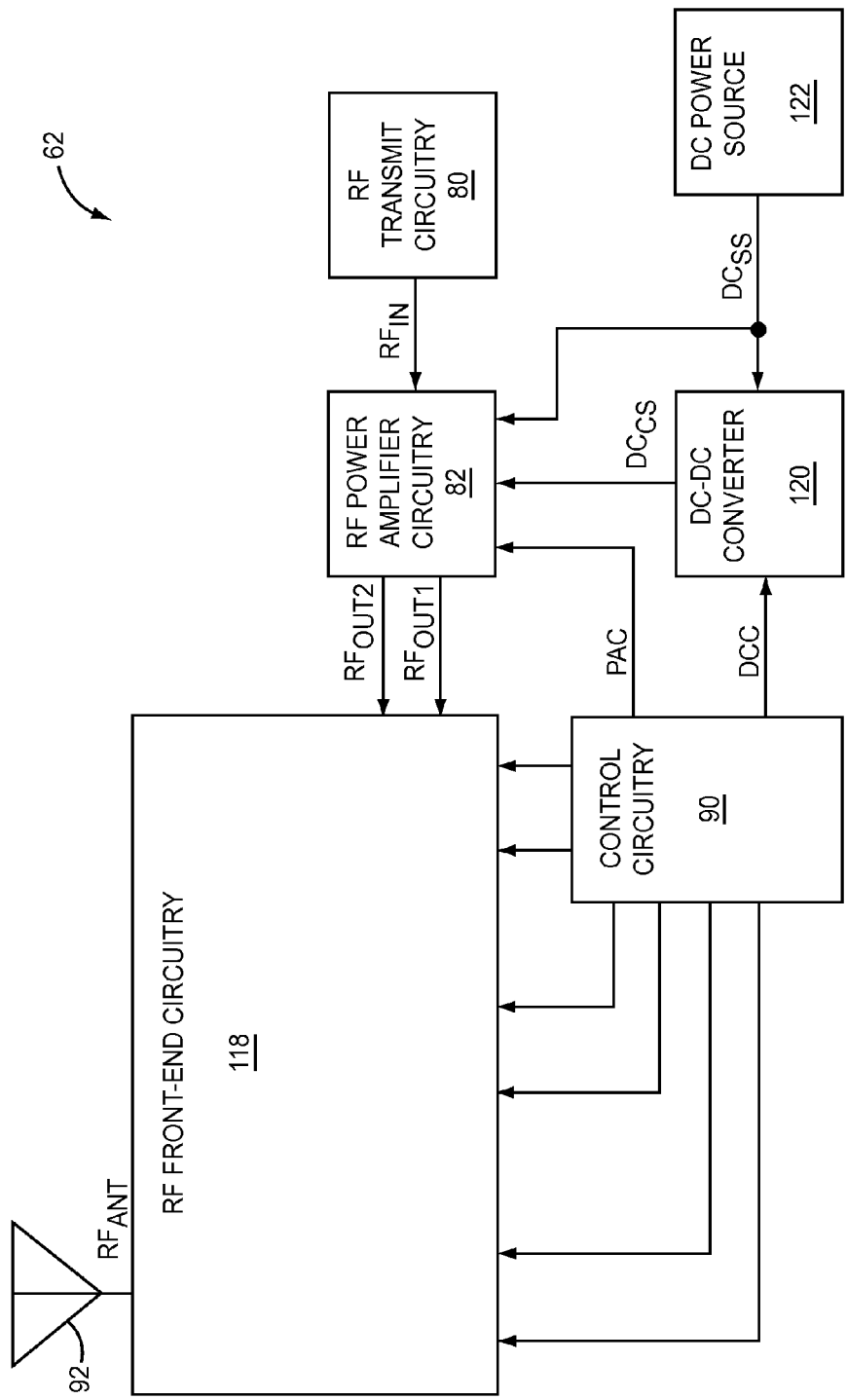
FIG. 12 shows the RF circuitry according to an additional embodiment of the RF circuitry.

FIG. 12 shows the RF circuitry 62 according to an additional embodiment of the RF circuitry 62. The RF front-end circuitry 118 illustrated in FIG. 12 is similar to the RF front-end circuitry 118 illustrated in FIG. 11, except in the RF front-end circuitry 118 illustrated in FIG. 12 the RF receive circuitry 78, the split band duplexer 64, the transmit switching circuitry 84, and the antenna switching circuitry 94 are not shown. As such, any or all of the RF receive circuitry 78, the split band duplexer 64, the transmit switching circuitry 84, and the antenna switching circuitry 94 may be omitted.

The RF circuitry 62 illustrated in FIG. 12 includes the control circuitry 90, the DC power source 122, and the DC-DC converter 120. In one embodiment (not shown) of the RF circuitry 62, the control circuitry 90 is provided external to the RF circuitry 62. In one embodiment (not shown) of the RF circuitry 62, the DC-DC converter 120 is provided external to the RF circuitry 62. In one embodiment (not shown) of the RF circuitry 62, the DC power source 122 is provided external to the RF circuitry 62. In one embodiment (not shown) of the RF circuitry 62, at least one of the control circuitry 90, the DC-DC converter 120, and the DC power source 122 are provided external to the RF circuitry 62. In one embodiment of the DC power source 122, the DC power source 122 is a battery.

In one embodiment of the RF circuitry 62, when operating, the control circuitry 90 selects one of an FDD operating mode and the TDD operating mode. The TDD operating mode may be a half-duplex operating mode, such that the RF circuitry 62 may transmit RF signals and may receive RF signals, but not simultaneously. The FDD operating mode may be a full-duplex operating mode, such that the RF circuitry 62 may transmit RF signals and may receive RF signals simultaneously. In one embodiment of the RF circuitry 62, the FDD operating mode includes the first FDD operating mode and the second FDD operating mode. In this regard, in one embodiment of the RF circuitry 62, the RF circuitry 62 operates in one of the FDD operating mode and the TDD operating mode.

In an alternate embodiment of the RF circuitry 62, when operating, the control circuitry 90 selects one of the FDD operating mode, the TDD operating mode, and a bypass operating mode. The TDD operating mode may be a half-duplex operating mode, such that the RF circuitry 62 may transmit RF signals and may receive RF signals, but not simultaneously. The FDD operating mode may be a full-duplex operating mode, such that the RF circuitry 62 may transmit RF signals and may receive RF signals simultaneously. The bypass operating mode may include a half-duplex operating mode, a full-duplex operating mode, or both In one embodiment of the RF circuitry 62, the FDD operating mode includes the first FDD operating mode and the second FDD operating mode. In this regard, in one embodiment of the RF circuitry 62, the RF circuitry 62 operates in one of the FDD operating mode, the TDD operating mode, and the bypass operating mode.

In one embodiment of the RF power amplifier circuitry 82, during the TDD operating mode, the RF power amplifier circuitry 82 receives and amplifies the RF input signal $RF_{IN}$ to provide the first RF output signal $RF_{OUT1}$ to the RF front-end circuitry 118. In one embodiment of the RF power amplifier circuitry 82, during the FDD operating mode, the RF power amplifier circuitry 82 receives and amplifies the RF input signal $RF_{IN}$ to provide the second RF output signal $RF_{OUT2}$ to the RF front-end circuitry 118.

In one embodiment of the first RF output signal $RF_{OUT1}$, the first RF output signal $RF_{OUT1}$ is a global system for mobile communications (GSM) RF signal. In an alternate embodiment of the first RF output signal $RF_{OUT1}$, the first RF output signal $RF_{OUT1}$ is a long term evolution (LTE) RF signal. In an additional embodiment of the first RF output signal $RF_{OUT1}$, the first RF output signal $RF_{OUT1}$ is a time division synchronous code division multiple access (TD- SCDMA) RF signal. In one embodiment of the second RF output signal $RF_{OUT2}$, the second RF output signal $RF_{OUT2}$ is an LTE RF signal. In an alternate embodiment of the second RF output signal $RF_{OUT2}$, the second RF output signal $RF_{OUT2}$ is a wideband code division multiple access (WCDMA) RF signal.

Figure 13:
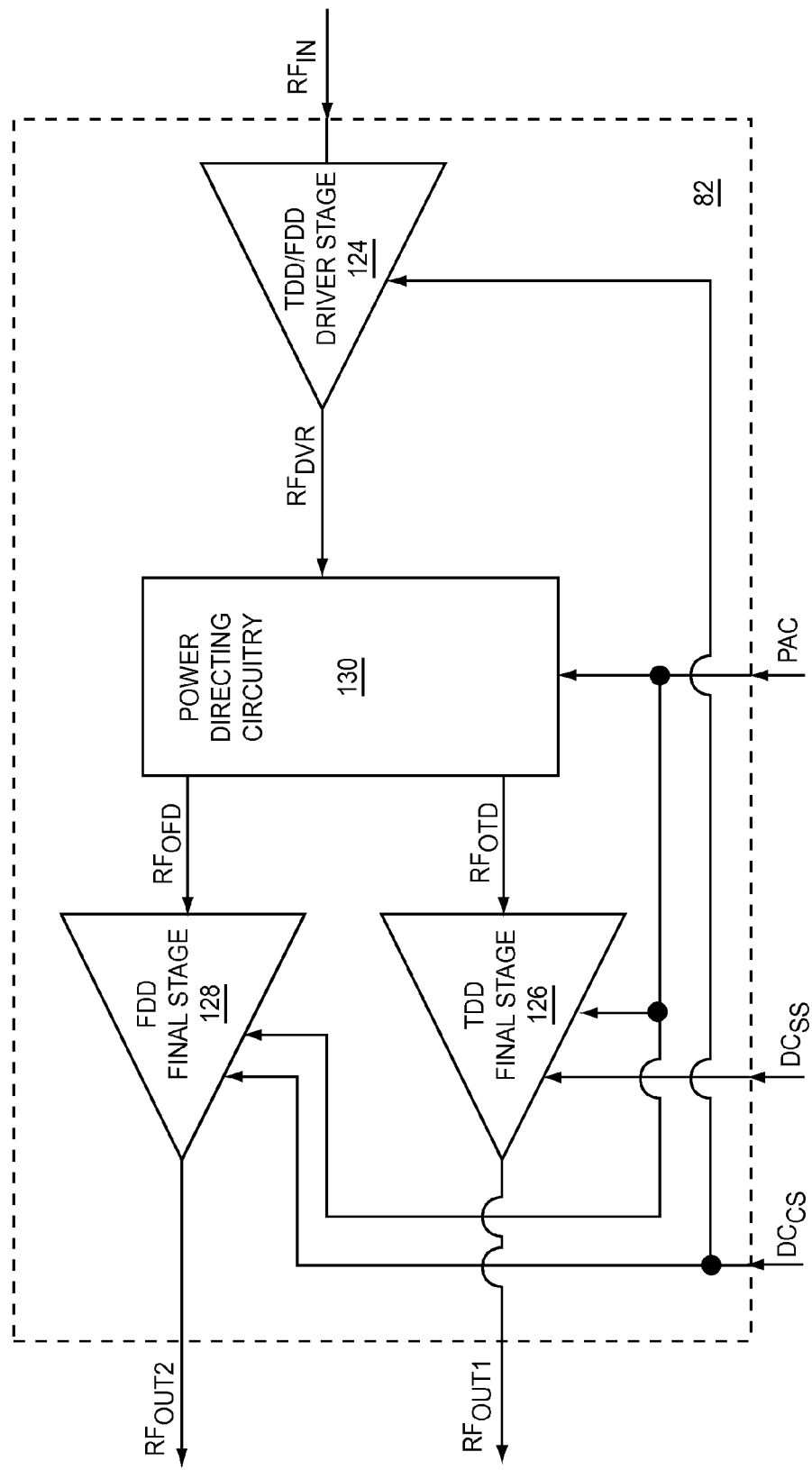
FIG. 13 shows details of RF power amplifier circuitry illustrated in FIG. 12 according to one embodiment of the RF power amplifier circuitry.

FIG. 13 shows details of the RF power amplifier circuitry 82 illustrated in FIG. 12 according to one embodiment of the RF power amplifier circuitry 82. The RF power amplifier circuitry 82 includes a TDD/FDD driver stage 124, a TDD final stage 126, an FDD final stage 128, and power directing circuitry 130. The power directing circuitry 130 is coupled between the TDD/FDD driver stage 124 and the TDD final stage 126, and is further coupled between the TDD/FDD driver stage 124 and the FDD final stage 128. The TDD/FDD driver stage 124 is coupled to the DC-DC converter 120 (FIG. 12). Further, the FDD final stage 128 is coupled to the DC-DC converter 120 (FIG. 12). As such, in one embodiment of the RF power amplifier circuitry 82, the DC-DC converter 120 (FIG. 12) is coupled between the DC power source 122 (FIG. 12) and the FDD final stage 128. In one embodiment of the RF power amplifier circuitry 82, the DC-DC converter 120 (FIG. 12) is coupled between the DC power source 122 (FIG. 12) and the TDD/FDD driver stage 124. The TDD final stage 126 is coupled to the DC power source 122 (FIG. 12).

The DC power source 122 (FIG. 12) provides the DC source signal $DC_{SS}$ to the TDD final stage 126. The DC-DC converter 120 provides the DC-DC converter supply signal $DC_{CS}$ to both the TDD/FDD driver stage 124 and the FDD final stage 128. The control circuitry 90 (FIG. 12) provides the PA control signal PAC to the TDD final stage 126, the FDD final stage 128, and the power directing circuitry 130. During both the TDD operating mode and the FDD operating mode, the TDD/FDD driver stage 124 receives and amplifies the RF input signal $RF_{IN}$ to provide a driver stage output signal $RF_{DVR}$. The DC-DC converter supply signal $DC_{CS}$ provides power for amplification to the TDD/FDD driver stage 124.

During the TDD operating mode, the power directing circuitry 130 receives and forwards the driver stage output signal $RF_{DVR}$ to provide a TDD output signal $RF_{OTD}$ to the TDD final stage 126. Further, during the TDD operating mode, the TDD final stage 126 receives and amplifies the TDD output signal $RF_{OTD}$ to provide the first RF output signal $RF_{OUT1}$. The DC source signal $DC_{SS}$ provides power for amplification to the TDD final stage 126. In one embodiment of the FDD final stage 128, during the TDD operating mode, the FDD final stage 128 is disabled.

During the FDD operating mode, the power directing circuitry 130 receives and forwards the driver stage output signal $RF_{DVR}$ to provide an FDD output signal $RF_{OFD}$ to the FDD final stage 128. Further, during the FDD operating mode, the FDD final stage 128 receives and amplifies the FDD output signal $RF_{OFD}$ to provide the second RF output signal $RF_{OUT2}$. The DC-DC converter supply signal $DC_{CS}$ provides power for amplification to the FDD final stage 128. In one embodiment of the TDD final stage 126, during the FDD operating mode, the TDD final stage 126 is disabled.

In an alternate embodiment (not shown) of the RF power amplifier circuitry 82, the control circuitry 90 (FIG. 12) provides the PA control signal PAC to the power directing circuitry 130 only, and does not provide the PA control signal PAC to the TDD final stage 126 and to the FDD final stage 128. As such, the power directing circuitry 130 includes selection circuitry that is configured based on the PA control signal PAC. As such, in one embodiment of the power directing circuitry 130, the power directing circuitry 130 includes an RF multiplexer (not shown), which is configured based on the PA control signal PAC. In an alternate embodiment of the power directing circuitry 130, the power directing circuitry 130 includes at least one RF switch (not shown), which is configured based on the PA control signal PAC.

In another embodiment (not shown) of the RF power amplifier circuitry 82, the control circuitry 90 (FIG. 12) provides the PA control signal PAC to the TDD final stage 126 and to the FDD final stage 128 only, and does not provide the PA control signal PAC to the power directing circuitry 130. As such, in one embodiment of the power directing circuitry 130, the power directing circuitry 130 senses a condition in each of the TDD final stage 126 and the FDD final stage 128, and forwards the driver stage output signal $RF_{DVR}$ to a selected one of the TDD final stage 126 and the FDD final stage 128 based on the sensed conditions in the TDD final stage 126 and the FDD final stage 128.

Figure 16:
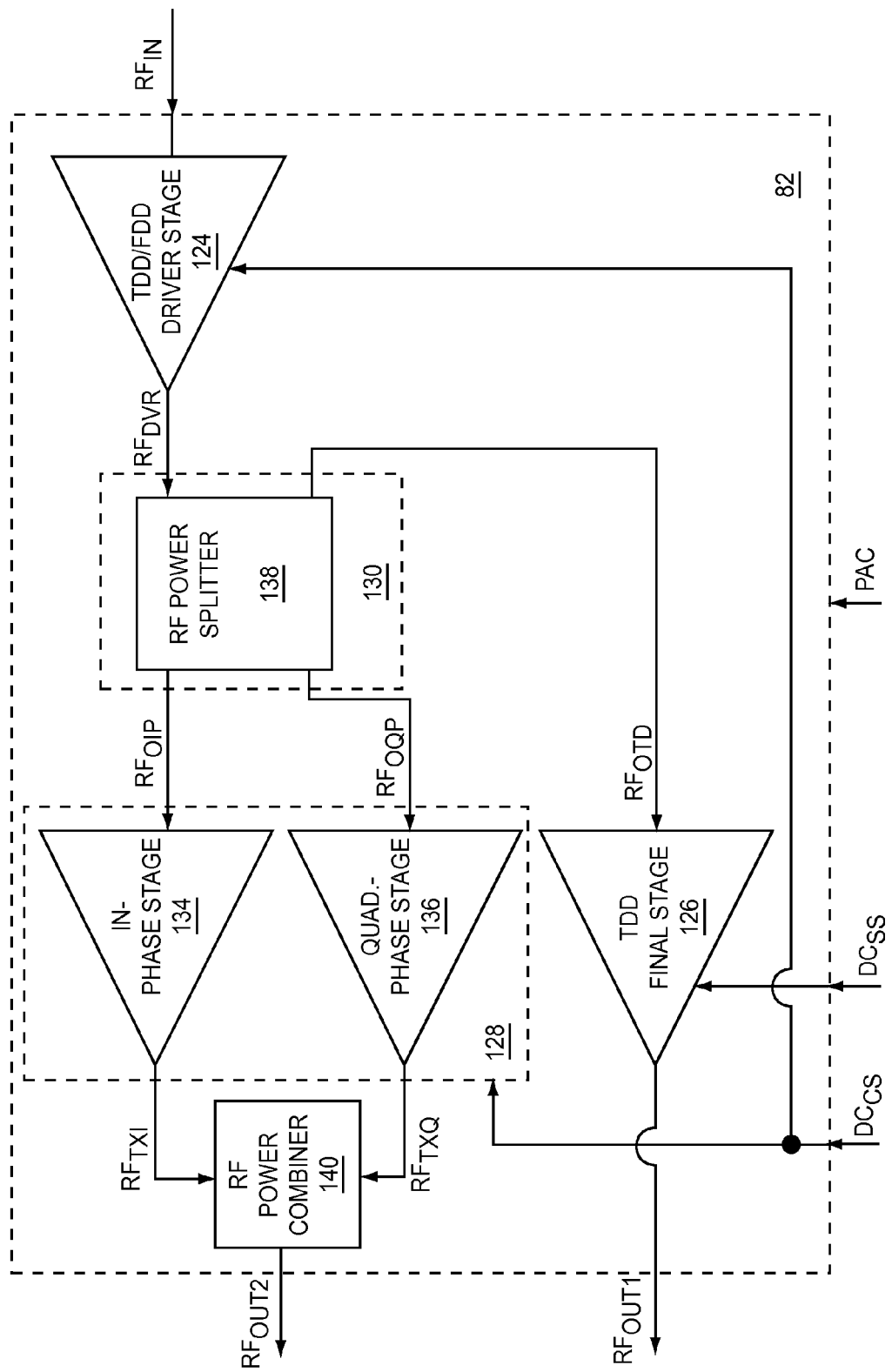
FIG. 16 shows details of RF power amplifier circuitry illustrated in FIG. 12 according to one embodiment of the RF power amplifier circuitry.

In an exemplary embodiment of the RF power amplifier circuitry 82, during the TDD operating mode, the FDD final stage 128 presents approximately a high impedance to the power directing circuitry 130 and the TDD final stage 126 presents a nominal load impedance to the power directing circuitry 130 based on the PA control signal PAC. As such, the power directing circuitry 130 senses the impedances presented by the TDD final stage 126 and the FDD final stage 128 and forwards the driver stage output signal $RF_{DVR}$ to the TDD final stage 126. Conversely, during the FDD operating mode, the FDD final stage 128 presents a nominal load impedance to the power directing circuitry 130 and the TDD final stage 126 presents approximately a high impedance to the power directing circuitry 130 based on the PA control signal PAC. As such, the power directing circuitry 130 senses the impedances presented by the TDD final stage 126 and the FDD final stage 128, and forwards the driver stage output signal $RF_{DVR}$ to the FDD final stage 128. In this regard, in one embodiment of the power directing circuitry 130, the power directing circuitry 130 includes an RF power splitter 138 (FIG. 16).

In one embodiment of the RF power amplifier circuitry 82, during the TDD operating mode and the FDD operating mode, the driver stage output signal $RF_{DVR}$ is provided via the TDD/FDD driver stage 124. During the TDD operating mode, the driver stage output signal $RF_{DVR}$ is directed to the TDD final stage 126 via the power directing circuitry 130. During the TDD operating mode, the first RF output signal $RF_{OUT1}$ is provided via the TDD final stage 126. During the FDD operating mode, the driver stage output signal $RF_{DVR}$ is directed to the FDD final stage 128 via the power directing circuitry 130. During the FDD operating mode, the second RF output signal $RF_{OUT2}$ is provided via the FDD final stage 128.

Figure 14:
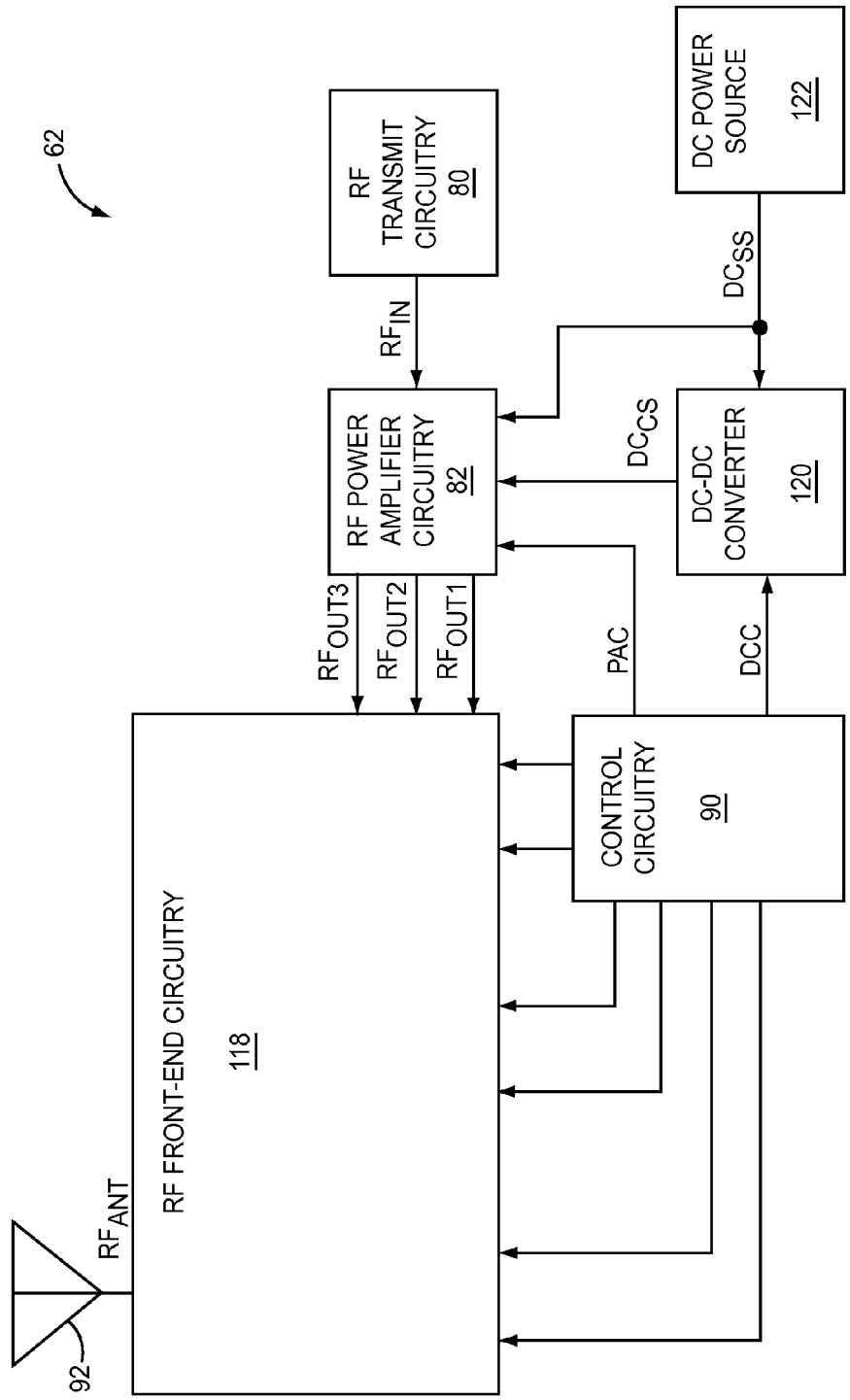
FIG. 14 shows the RF circuitry according to another embodiment of the RF circuitry.

FIG. 14 shows the RF circuitry 62 according to another embodiment of the RF circuitry 62. The RF circuitry 62 illustrated in FIG. 14 is similar to the RF circuitry 62 illustrated in FIG. 12, except in the RF circuitry 62 illustrated in FIG. 14, the RF power amplifier circuitry 82 further provides a third RF output signal $RF_{OUT3}$ to the RF front-end circuitry 118. In one embodiment of the RF circuitry 62, when operating, the control circuitry 90 selects one of the FDD operating mode, the TDD operating mode, and the bypass operating mode. As such, the PA control signal PAC is indicative of the selection of the one of the FDD operating mode, the TDD operating mode, and the bypass operating mode.

In one embodiment of the RF power amplifier circuitry 82, during the TDD operating mode, the RF power amplifier circuitry 82 receives and amplifies the RF input signal $RF_{IN}$ to provide the first RF output signal $RF_{OUT1}$ to the RF front-end circuitry 118. In one embodiment of the RF power amplifier circuitry 82, during the FDD operating mode, the RF power amplifier circuitry 82 receives and amplifies the RF input signal $RF_{IN}$ to provide the second RF output signal $RF_{OUT2}$ to the RF front-end circuitry 118. In one embodiment of the RF power amplifier circuitry 82, during the bypass operating mode, the RF power amplifier circuitry 82 receives and amplifies the RF input signal $RF_{IN}$ to provide the third RF output signal $RF_{OUT3}$ to the RF front-end circuitry 118.

In one embodiment of the third RF output signal $RF_{OUT3}$, the third RF output signal $RF_{OUT3}$ is a GSM RF signal. In an alternate embodiment of the third RF output signal $RF_{OUT3}$, the third RF output signal $RF_{OUT3}$ is an LTE RF signal. In an additional embodiment of the third RF output signal $RF_{OUT3}$, the third RF output signal $RF_{OUT3}$ is a TD-SCDMA RF signal. In another embodiment of the third RF output signal $RF_{OUT3}$, the third RF output signal $RF_{OUT3}$ is a WCDMA RF signal.

Figure 15:
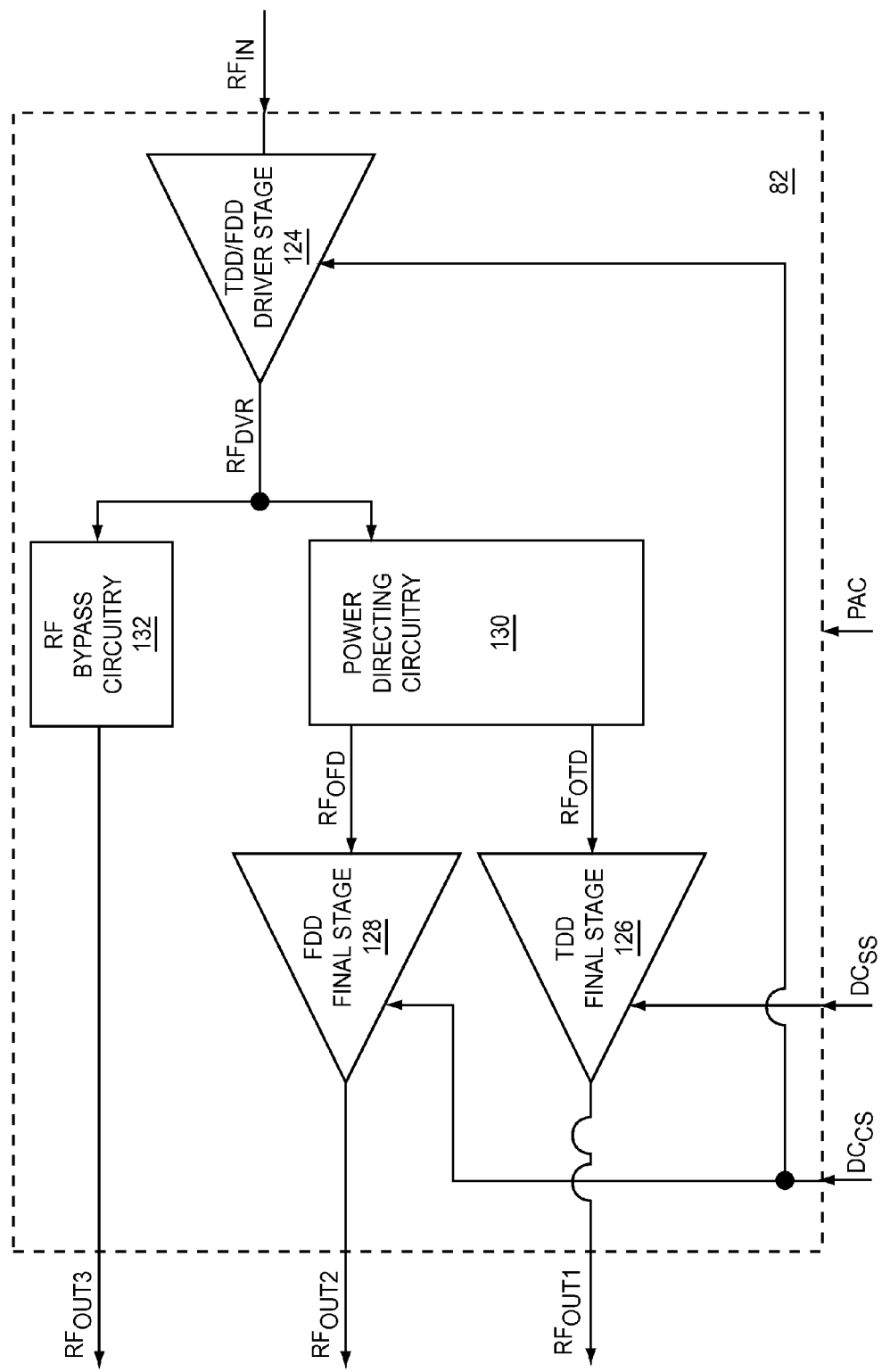
FIG. 15 shows details of RF power amplifier circuitry illustrated in FIG. 14 according to one embodiment of the RF power amplifier circuitry.

FIG. 15 shows details of RF power amplifier circuitry 82 illustrated in FIG. 14 according to one embodiment of the RF power amplifier circuitry 82. The RF power amplifier circuitry 82 illustrated in FIG. 15 is similar to the RF power amplifier circuitry 82 illustrated in FIG. 13, except the RF power amplifier circuitry 82 illustrated in FIG. 15 further includes RF bypass circuitry 132 coupled to an output from the TDD/FDD driver stage 124.

In one embodiment of the RF power amplifier circuitry 82, during the TDD operating mode, the TDD final stage 126 receives and amplifies the TDD output signal $RF_{OTD}$ to provide the first RF output signal $RF_{OUT1}$. In one embodiment of the RF power amplifier circuitry 82, during the FDD operating mode, the FDD final stage 128 receives and amplifies the FDD output signal $RF_{OFD}$ to provide the second RF output signal $RF_{OUT2}$. In one embodiment of the RF power amplifier circuitry 82, during the bypass operating mode, the RF bypass circuitry 132 receives and forwards the driver stage output signal $RF_{DVR}$ to provide the third RF output signal $RF_{OUT3}$.

In one embodiment of the RF power amplifier circuitry 82, during the TDD operating mode, the FDD final stage 128 is disabled. In one embodiment of the RF power amplifier circuitry 82, during the FDD operating mode, the TDD final stage 126 is disabled. In one embodiment of the RF power amplifier circuitry 82, during the bypass operating mode, both the TDD final stage 126 and the FDD final stage 128 are disabled.

In one embodiment of the RF power amplifier circuitry 82, the control circuitry 90 (FIG. 12) provides the PA control signal PAC to the TDD final stage 126, the FDD final stage 128, the power directing circuitry 130, and the RF bypass circuitry 132. In an alternate embodiment of the RF power amplifier circuitry 82, the control circuitry 90 (FIG. 12) provides the PA control signal PAC to the power directing circuitry 130 and the RF bypass circuitry 132. In an additional embodiment of the RF power amplifier circuitry 82, the control circuitry 90 (FIG. 12) provides the PA control signal PAC to the TDD final stage 126, the FDD final stage 128, and the RF bypass circuitry 132. In one embodiment of the RF bypass circuitry 132, the RF bypass circuitry 132 includes at least one RF switch (not shown), which is configured based on the PA control signal PAC.

FIG. 16 shows details of RF power amplifier circuitry 82 illustrated in FIG. 12 according to one embodiment of the RF power amplifier circuitry 82. The RF power amplifier circuitry 82 illustrated in FIG. 16 is similar to the RF power amplifier circuitry 82 illustrated in FIG. 13, except in the RF power amplifier circuitry 82 illustrated in FIG. 16 the FDD final stage 128 is a quadrature stage, which includes an in-phase stage 134 and a quadrature-phase stage 136; the TDD final stage 126 is a single-ended stage; the power directing circuitry 130 includes the RF power splitter 138; and the RF power amplifier circuitry 82 further includes an RF power combiner 140.

In the TDD operating mode, the RF power splitter 138 receives and forwards the driver stage output signal $RF_{DVR}$ to provide the TDD output signal $RF_{OTD}$ to the TDD final stage 126. In the FDD operating mode, the RF power splitter 138 receives, splits, and phase-shifts the driver stage output signal $RF_{DVR}$ to provide an in-phase FDD output signal $RF_{OIP}$ to the in-phase stage 134 and to provide a quadrature-phase FDD output signal $RF_{OQP}$ to the quadrature-phase stage 136. As such, in one embodiment of the RF power splitter 138, the quadrature-phase FDD output signal $RF_{OQP}$ is phase-shifted from the in-phase FDD output signal $RF_{OIP}$ by about 90 degrees.

The in-phase stage 134 receives and amplifies the in-phase FDD output signal $RF_{OIP}$ to provide an in-phase transmit signal $RF_{TXI}$ to the RF power combiner 140. Further, the quadrature-phase stage 136 receives and amplifies the quadrature-phase FDD output signal $RF_{OQP}$ to provide a quadrature-phase transmit signal $RF_{TXQ}$ to the RF power combiner 140. In one embodiment of the RF power combiner 140, the RF power combiner 140 receives, phase-aligns, and combines the in-phase transmit signal $RF_{TXI}$ and the quadrature-phase transmit signal $RF_{TXQ}$ to provide the second RF output signal $RF_{OUT2}$.

Figure 17:
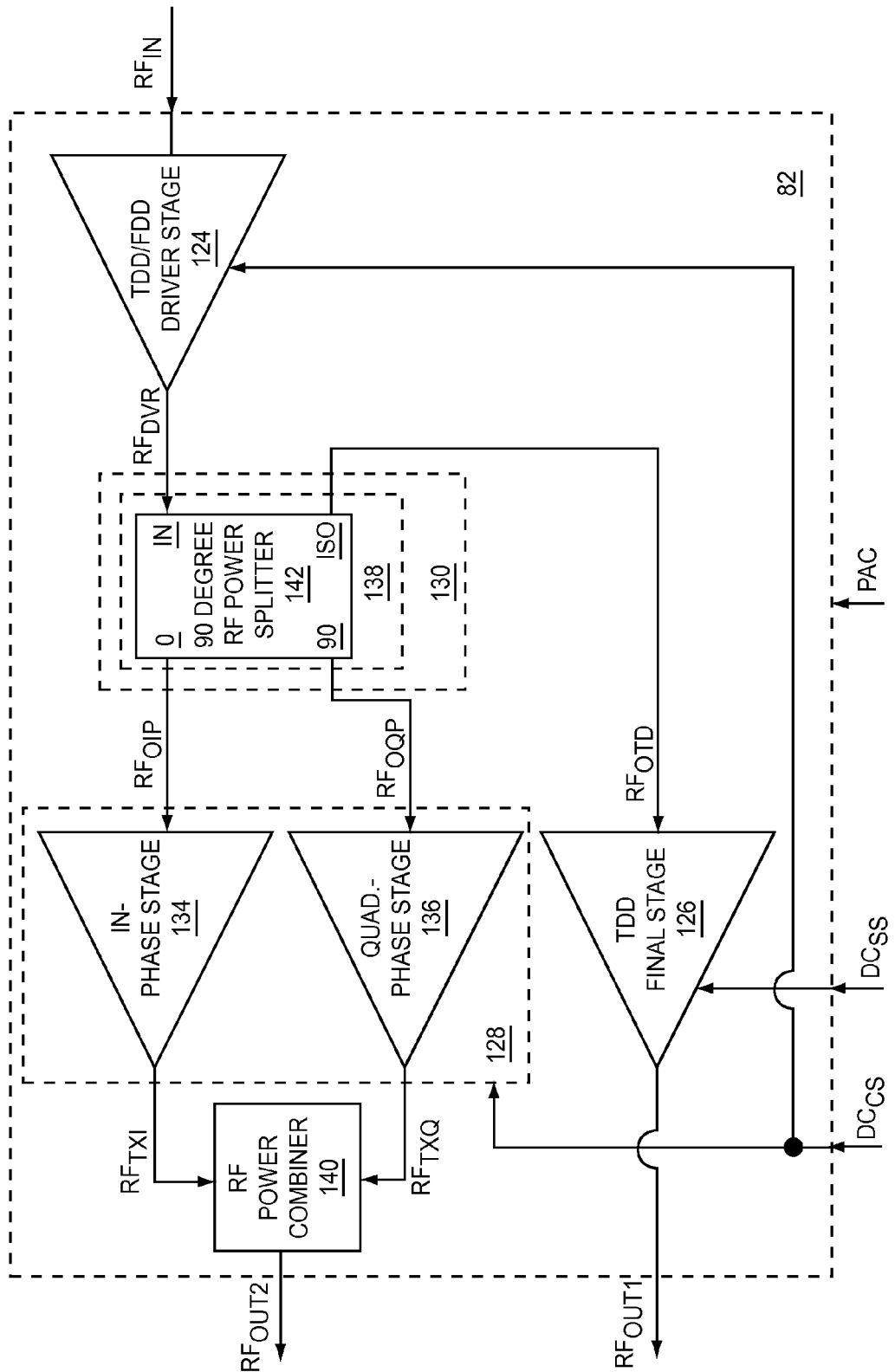
FIG. 17 shows details of RF power amplifier circuitry illustrated in FIG. 12 according to an additional embodiment of the RF power amplifier circuitry.

FIG. 17 shows details of RF power amplifier circuitry 82 illustrated in FIG. 12 according to an additional embodiment of the RF power amplifier circuitry 82. The RF power amplifier circuitry 82 illustrated in FIG. 17 is similar to the RF power amplifier circuitry 82 illustrated in FIG. 16, except in the RF power amplifier circuitry 82 illustrated in FIG. 17, the RF power splitter 138 includes a 90 degree RF power splitter 142. The 90 degree RF power splitter 142 includes an input port IN, an in-phase port 0, a quadrature-phase port 90, and an isolated port ISO. The input port IN is coupled to the TDD/FDD driver stage 124. The in-phase port 0 is coupled to the in-phase stage 134. The quadrature-phase port 90 is coupled to the quadrature-phase stage 136. The isolated port ISO is coupled to the TDD final stage 126.

In one embodiment of the RF power amplifier circuitry 82, during the FDD operating mode, the in-phase stage 134 presents a nominal load impedance to the in-phase port 0, the quadrature-phase stage 136 presents a nominal load impedance to the quadrature-phase port 90, and the 90 degree RF power splitter 142 receives, splits, and phase-shifts the driver stage output signal $RF_{DVR}$ to provide the in-phase FDD output signal $RF_{OIP}$ and the quadrature-phase FDD output signal $RF_{OQP}$. During the TDD operating mode, the TDD final stage 126 presents a nominal load impedance to the 90 degree RF power splitter 142, the in-phase stage 134 presents approximately a high impedance to the in-phase port 0, the quadrature-phase stage 136 presents approximately a high impedance to the quadrature-phase port 90, and the 90 degree RF power splitter 142 receives and forwards the driver stage output signal $RF_{DVR}$ to provide the TDD output signal $RF_{OTD}$. In one embodiment of the 90 degree RF power splitter 142, the 90 degree RF power splitter 142 is a hybrid RF power splitter.

Figure 18:
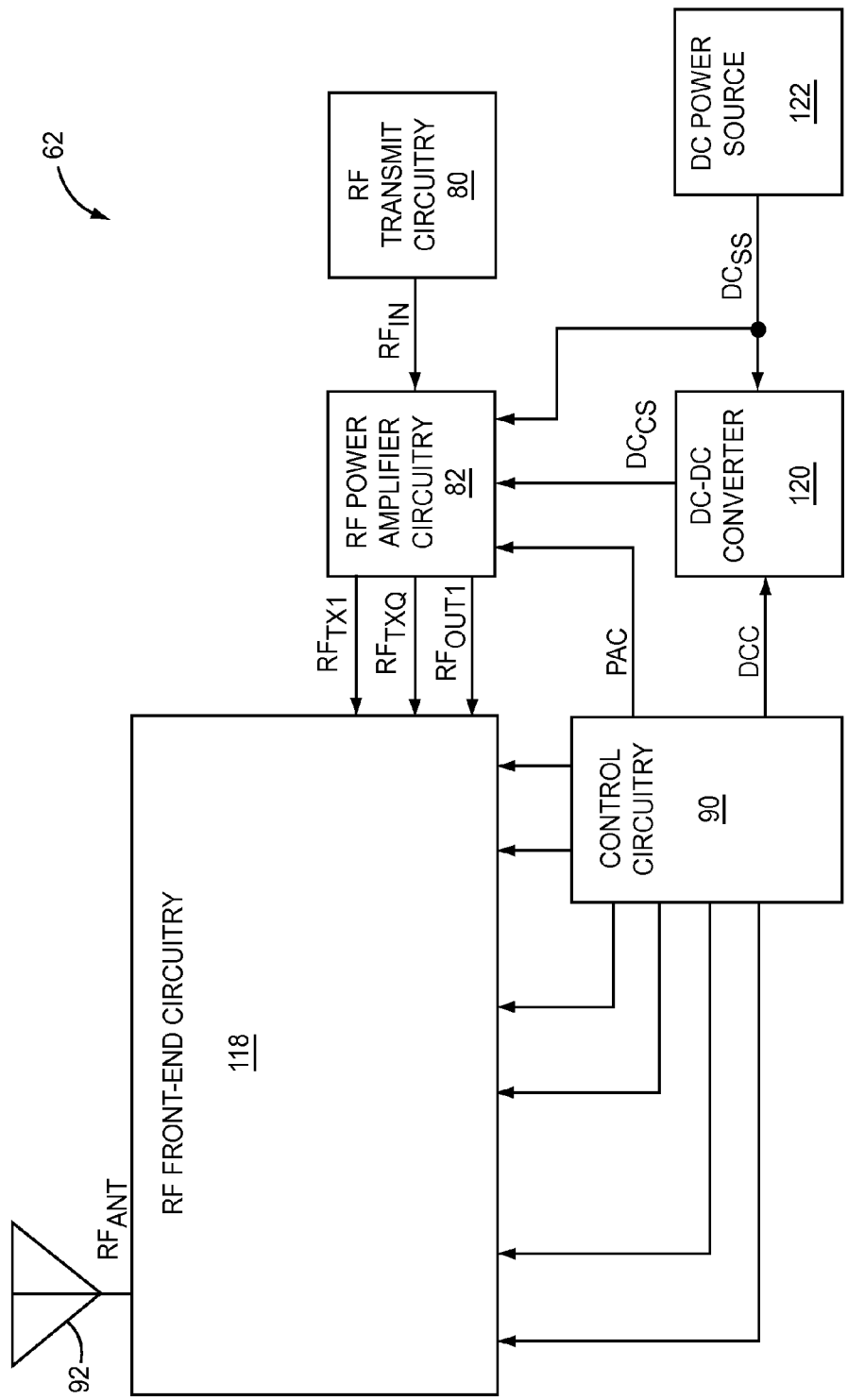
FIG. 18 shows the RF circuitry according to a further embodiment of the RF circuitry.

FIG. 18 shows the RF circuitry 62 according to a further embodiment of the RF circuitry 62. The RF circuitry 62 illustrated in FIG. 18 is similar to the RF circuitry 62 illustrated in FIG. 12, except in the RF circuitry 62 illustrated in FIG. 18, the RF power amplifier circuitry 82 provides the in-phase transmit signal $RF_{TXI}$ and the quadrature-phase transmit signal $RF_{TXQ}$ instead of providing the second RF output signal $RF_{OUT2}$.

Figure 19:
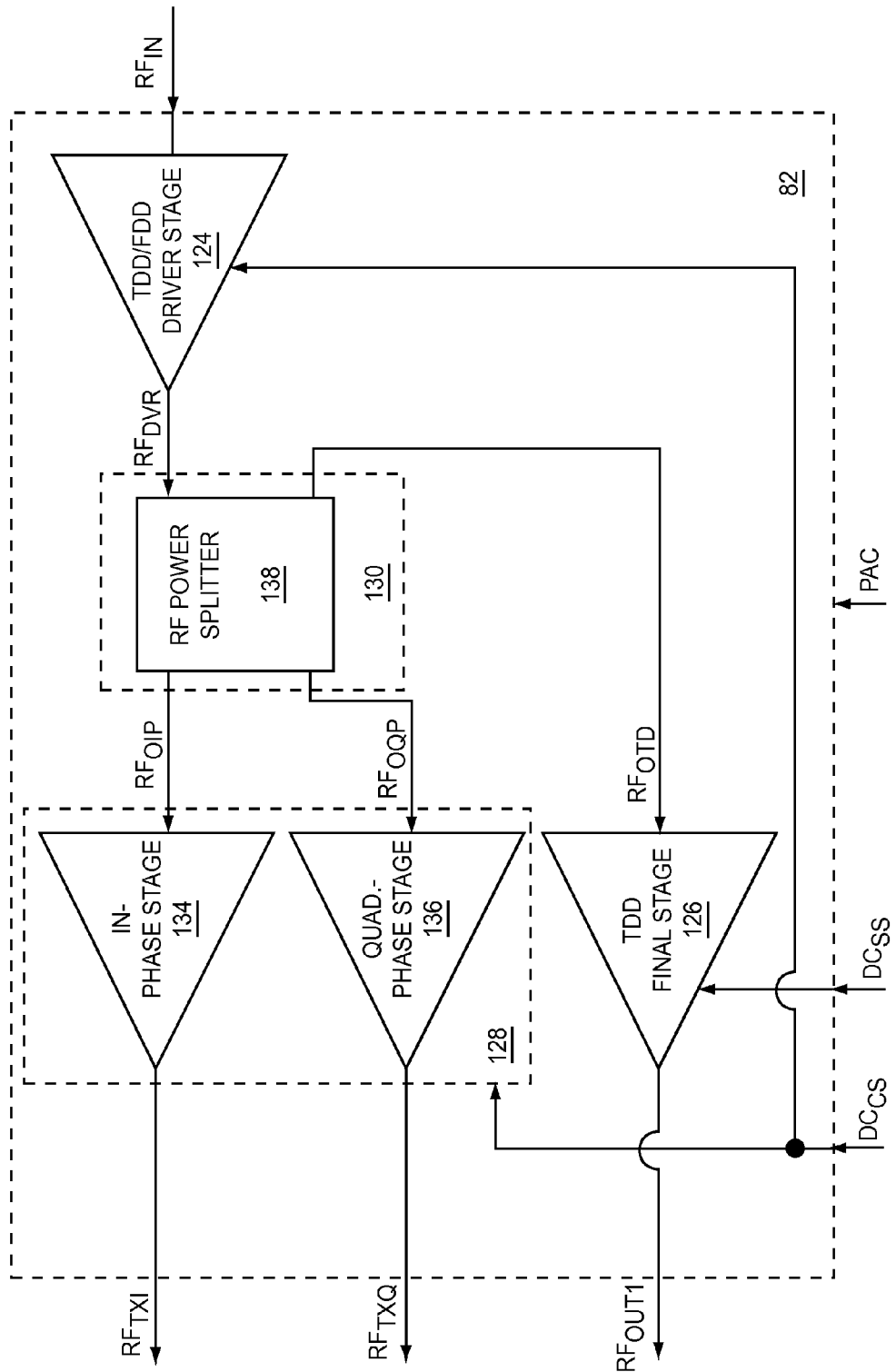
FIG. 19 shows details of RF power amplifier circuitry illustrated in FIG. 18 according to one embodiment of the RF power amplifier circuitry.

FIG. 19 shows details of RF power amplifier circuitry 82 illustrated in FIG. 18 according to one embodiment of the RF power amplifier circuitry 82. The RF power amplifier circuitry 82 illustrated in FIG. 19 is similar to the RF power amplifier circuitry 82 illustrated in FIG. 16, except in the RF power amplifier circuitry 82 illustrated in FIG. 19, the RF power combiner 140 is omitted. As such, the RF power amplifier circuitry 82 illustrated in FIG. 19 provides the in-phase transmit signal $RF_{TXI}$ and the quadrature-phase transmit signal $RF_{TXQ}$ instead of providing the second RF output signal $RF_{OUT2}$.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present invention. All such improvements and modifications are considered within the scope of the concepts disclosed herein and the claims that follow.

What is claimed is:

1. Radio frequency (RF) circuitry configured to selectively operate in one of a TDD operating mode and an FDD operating mode, and comprising:
   an RF power splitter;
   a time division duplex (TDD)/frequency division duplex (FDD) driver stage;
   a TDD final stage, wherein during the TDD operating mode, the TDD final stage is configured to receive and amplify a first RF input signal from the RF power splitter to provide a first RF output signal; and
   an FDD final stage comprising an in-phase stage and a quadrature-phase stage, wherein during the FDD operating mode, the in-phase stage is configured to receive and amplify an RF in-phase input signal from the RF power splitter to provide an RF in-phase output signal, and the quadrature-phase stage is configured to receive and amplify an RF quadrature-phase input signal from the RF power splitter to provide an RF quadrature-phase output signal,
   wherein the RF power splitter is coupled between an output from the TDD/FDD driver stage and corresponding inputs to each of the in-phase stage, the quadrature-phase stage, and the TDD final stage.

2. The RF circuitry of claim 1 further comprising RF bypass circuitry coupled to the output from the TDD/FDD driver stage.

3. The RF circuitry of claim 2 further configured to operate in one of the TDD operating mode, the FDD operating mode, and a bypass operating mode, such that
   during the bypass operating mode, the TDD/FDD driver stage is configured to provide a third RF output signal.

4. The RF circuitry of claim 3 wherein:
   during the TDD operating mode, the FDD final stage is further configured to be disabled;
   during the FDD operating mode, the TDD final stage is further configured to be disabled; and
   during the bypass operating mode, both the TDD final stage and the FDD final stage are further configured to be disabled.

5. The RF circuitry of claim 1 wherein the TDD final stage is a single-ended stage.

6. The RF circuitry of claim 5 wherein:
   the RF power splitter is a 90 degree power splitter;
   an in-phase port from the 90 degree power splitter is coupled to the in-phase stage;
   a quadrature-phase port from the 90 degree power splitter is coupled to the quadrature-phase stage; and
   an isolated port from the 90 degree power splitter is coupled to the TDD final stage.

7. The RF circuitry of claim 1 further comprising a direct current (DC)-DC converter coupled between a DC power source and the FDD final stage.

8. The RF circuitry of claim 7 further comprising the DC power source.

9. The RF circuitry of claim 7 wherein the DC power source is a battery.

10. The RF circuitry of claim 7 wherein:
    the TDD/FDD driver stage is coupled to the DC-DC converter; and
    the TDD final stage is coupled to the DC power source.

11. The RF circuitry of claim 1 wherein
    during both the TDD operating mode and the FDD operating mode, the TDD/FDD driver stage is configured to provide a driver stage output signal.

12. The RF circuitry of claim 11 wherein the FDD operating mode comprises a first FDD operating mode and a second FDD operating mode.

13. The RF circuitry of claim 1 wherein control circuitry is adapted to select the one of the TDD operating mode and the FDD operating mode.

14. The RF circuitry of claim 13 further comprising the control circuitry.

15. The RF circuitry of claim 1 further comprising an RF power combiner configured to during the FDD operating mode, receive and combine the RF in-phase output signal and the RF quadrature-phase output signal to provide a second RF output signal, wherein the second RF output signal is a long term evolution (LTE) RF signal.

16. The RF circuitry of claim 1 further comprising an RF power combiner configured to during the FDD operating mode, receive and combine the RF in-phase output signal and the RF quadrature-phase output signal to provide a second RF output signal, wherein the second RF output signal is a wideband code division multiple access (WCDMA) RF signal.

17. The RF circuitry of claim 1 wherein the first RF output signal is a global system for mobile communications (GSM) RF signal.

18. The RF circuitry of claim 1 wherein the first RF output signal is a long term evolution (LTE) RF signal.

19. The RF circuitry of claim 1 wherein the first RF output signal is a time division synchronous code division multiple access (TD-SCDMA) RF signal.

* * * * *